United States Patent
Hwang et al.

(10) Patent No.: US 9,984,308 B2
(45) Date of Patent: May 29, 2018

(54) METHOD AND APPARATUS FOR EXTRACTING FEATURE REGIONS FROM POINT CLOUD

(71) Applicant: Samsung Electronics Co., Ltd., Suwon-Si, Gyeonggi-Do (KR)

(72) Inventors: Hyoseok Hwang, Seoul (KR); Dong Kyung Nam, Yongin-si (KR)

(73) Assignee: SAMSUNG ELECTRONICS CO., LTD., Gyeonggi-do (KR)

( * ) Notice: Subject to any disclaimer, the term of this patent is extended or adjusted under 35 U.S.C. 154(b) by 10 days.

(21) Appl. No.: 14/559,393

(22) Filed: Dec. 3, 2014

(65) Prior Publication Data

US 2015/0371110 A1  Dec. 24, 2015

(30) Foreign Application Priority Data

Jun. 20, 2014  (KR) .................. 10-2014-0075527

(51) Int. Cl.
| | |
|---|---|
| G06K 9/00 | (2006.01) |
| G06K 9/40 | (2006.01) |
| G06K 9/62 | (2006.01) |
| G06K 9/52 | (2006.01) |
| G06T 17/00 | (2006.01) |
| G06K 9/46 | (2006.01) |
| G06T 7/11 | (2017.01) |

(52) U.S. Cl.
CPC ........ *G06K 9/6211* (2013.01); *G06K 9/00201* (2013.01); *G06K 9/4671* (2013.01); *G06K 9/527* (2013.01); *G06T 7/11* (2017.01); *G06T 17/005* (2013.01); *G06T 2207/10028* (2013.01); *G06T 2207/20021* (2013.01); *G06T 2210/56* (2013.01)

(58) Field of Classification Search
CPC .............. G06K 9/6211; G06K 9/4671; G06K 9/00201; G06K 9/527; G06T 7/0081; G06T 7/0042; G06T 17/005; G06T 2210/56; G06T 2207/20021; G06T 2207/10028
USPC .............................. 382/201, 154, 190, 274
See application file for complete search history.

(56) References Cited

U.S. PATENT DOCUMENTS

| | | | |
|---|---|---|---|
| 7,382,897 B2 | 6/2008 | Brown et al. | |
| 7,474,776 B2 * | 1/2009 | Kaufman | ............... A61B 5/055 378/41 |
| 7,856,125 B2 | 12/2010 | Medioni et al. | |
| 8,351,571 B2 | 1/2013 | Brinks et al. | |

(Continued)

FOREIGN PATENT DOCUMENTS

| | | |
|---|---|---|
| KR | 100795570 B1 | 1/2008 |
| KR | 100797400 B1 | 1/2008 |

(Continued)

OTHER PUBLICATIONS

Flint A et al: "Local 3D structure recognition in range images", IET Computer Vision, vol. 2, No. 4, Dec. 11, 2008, pp. 208-217, XP006032109.

(Continued)

*Primary Examiner* — Sheela C Chawan
(74) *Attorney, Agent, or Firm* — Harness, Dickey & Pierce, P.L.C.

(57) ABSTRACT

An apparatus and method for extracting a feature region from a point cloud are provided. The apparatus may divide the point cloud into a plurality of regions, and may extract at least one feature region from among the regions.

37 Claims, 20 Drawing Sheets

(56) References Cited

U.S. PATENT DOCUMENTS

| | | | |
|---|---|---|---|
| 8,396,284 B2 | 3/2013 | Wheeler et al. | |
| 8,406,487 B2 | 3/2013 | Abramovich et al. | |
| 8,670,591 B2* | 3/2014 | Mendez-Rodriguez | G01S 17/89 345/424 |
| 2011/0205338 A1* | 8/2011 | Choi | G06T 7/74 348/46 |
| 2014/0172377 A1* | 6/2014 | Taubin | G06T 17/00 703/1 |
| 2015/0164356 A1* | 6/2015 | Merschon | A61B 5/04017 600/374 |

FOREIGN PATENT DOCUMENTS

| | | |
|---|---|---|
| KR | 101054736 B1 | 8/2011 |
| KR | 20130037996 A | 4/2013 |
| KR | 20130077653 A | 7/2013 |
| KR | 20130089649 A | 8/2013 |

OTHER PUBLICATIONS

Jan Knopp et al: "Hough Transform and 3D SURF for Robust Three Dimensional Classification", Sep. 5, 2010, Computer Vision—ECCV 2010, Sep. 5-11, 2010, pp. 589-602, XP019150824.

Jean-Francois Lalonde et al: "Natural terrain classification using three-dimensional ladar data for ground robot mobility", Journal of Field Robotics, vol. 23, No. 10, Jun. 7, 2006, pp. 839-861, XP055253221.

Dimitri Lisin: "Image Classification With Bags of Local Features", PhD, Univ. of Massachusetts Amherst, May 1, 2006, XP055253284.

Ben Gorte et al: "3D Image Processing to Reconstruct Trees from Laser Scans", Proceedings of the 10th annual conference of the Advanced School for Computing and Imaging, Jun. 1, 2004, XP055253380.

Anonymous: "Point Cloud Library (PCL) : Module filters", Jul. 17, 2014, XP055253373.

Extended European Search Report dated Mar. 21, 2016.

R.B. Rusu, "Semantic 3D Object Maps for Everyday Manipulation in Human Living Environments", thesis, 2009, pp. 1-284.

V. Galiano et al., "GPU-based 3D Wavelet Transform", International Conference Computational and Mathematical Methods in Science and Engineering, Jul. 2012, pp. 1-12.

* cited by examiner

METHOD AND APPARATUS FOR EXTRACTING FEATURE REGIONS FROM POINT CLOUD

CROSS-REFERENCE TO RELATED APPLICATION

This application claims the priority benefit of Korean Patent Application No. 10-2014-0075527, filed on Jun. 20, 2014, in the Korean Intellectual Property Office, the entire contents of which is incorporated herein by reference.

BACKGROUND

1. Field

At least some example embodiments of the following description relate to a method and apparatus for extracting a feature region from a point cloud.

2. Description of the Related Art

In a two-dimensional (2D) image, a point having a greatest change in a brightness value.

SUMMARY

At least one example embodiment discloses a method of extracting a feature region, the method including dividing a point cloud into a plurality of regions, and extracting at least one feature region from among the plurality of regions based on a point intensity.

The point intensity may be associated with a concentration of a plurality of points in the point cloud. Additionally, the point intensity may be calculated for each of the plurality of regions. The calculating calculates each point intensity based on a number of points included in the corresponding region.

The extracting may include generating a hierarchical structure, the plurality of regions being arranged in a hierarchy in the hierarchical structure and analyzing the plurality of regions, and extracting at least one feature region based on the hierarchical structure.

A region included in a higher level of the hierarchical structure may include information on point intensities corresponding to regions included in a lower level of the hierarchical structure. When a first region included in a higher level of the hierarchical structure is explored, a second region included in a lower level of the hierarchical structure may be explored. When the first region is determined not to be a feature region in the higher level, the second region may not be explored.

The generating may generate the hierarchical structure by applying a discrete wavelet transform (DWT) to the plurality of regions. Whether a current region currently being explored is a feature region may be determined based on DWT subbands corresponding to the current region.

The extracting may extract the at least one feature region based on at least one of a first condition associated with a high frequency feature of a selected region of the plurality of regions, a second condition associated with whether the selected region is connected to at least one neighboring region, and a third condition associated with whether the selected region is similar to the at least one neighboring region.

A size of each of the plurality of regions may be determined based on at least one of distribution of the point cloud and a depth of a hierarchical structure of the plurality of regions. The plurality of regions each may have a regular hexahedral shape.

The method may further include extracting a feature point from the at least one feature region. The method may further include recognizing at least one of an object corresponding to the point cloud and an operation corresponding to the point cloud, based on the feature point.

At least one example embodiment discloses an apparatus for extracting a feature region, the apparatus including a receiver configured to receive a point cloud, a divider configured to divide the point cloud into a plurality of regions, a generator configured to generate a hierarchical structure in which the plurality of regions are arranged in a hierarchy, and an extractor configured to extract at least one feature region from the plurality of regions based on the hierarchical structure.

The extractor may extract a region corresponding to the at least one feature region in a first level of the hierarchical structure, may set a plurality of regions included in a second level of the hierarchical structure, and to analyze the second regions, and the first level may be higher than the second level.

The extractor is configured to only analyze the set regions among the second regions in the second level. The extractor may extract a third region corresponding to the at least one feature region from among the second regions, to set a plurality of fourth regions included in a third level of the hierarchical structure, and to analyze the fourth regions, and the third level may be lower than the second level.

The apparatus may further include a calculator configured to calculate a plurality of point intensities corresponding to the plurality of regions. Each of the plurality of regions may be associated with a level in the hierarchical structure and a first level of the hierarchical structure may include information on point intensities corresponding to regions included in a second level of the hierarchical structure, the first level being higher than the second level in the hierarchical structure.

The apparatus may further include a detector configured to extract a feature point from among the at least one feature region. Additionally, the apparatus may further include a recognizer configured to recognize at least one of an object corresponding to the point cloud and an operation corresponding to the point cloud, based on the feature point.

At least one example embodiment discloses a method of extracting a feature point in an image. The method includes generating a plurality of voxels from a point cloud of the image, each of the voxels having a value associated with a number of points in the corresponding voxel, determining at least one feature region based on the plurality of voxels and the corresponding values and extracting the feature point based on the at least one feature region.

In an example embodiment, the determining includes applying a discrete wavelet transform (DWT) to the plurality of voxels based on the respective values and determining the at least one feature region based on the applying.

In an example embodiment, the determining includes selecting at least one of the plurality of voxels, determining a connection value associated with the selected voxel, the connection value indicating whether the selected voxel is connected to a number of other voxels and determining the at least one feature region based on the connection value.

In an example embodiment, the determining includes selecting at least one of the plurality of voxels, determining a saliency value associated with the selected voxel, the saliency value indicating a rate of change of intensities of at least a threshold number of frequency subbands associated with the selected voxel and determining the at least one feature region based on the saliency value.

In an example embodiment, the determining includes selecting at least one of the plurality of voxels, determining a similarity value associated with the selected voxel, the similarity value indicating whether the selected voxel is similar to neighboring voxels and determining the at least one feature region based on the similarity value.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of example embodiments, taken in conjunction with the accompanying drawings of which.

DETAILED DESCRIPTION

Figure 1:
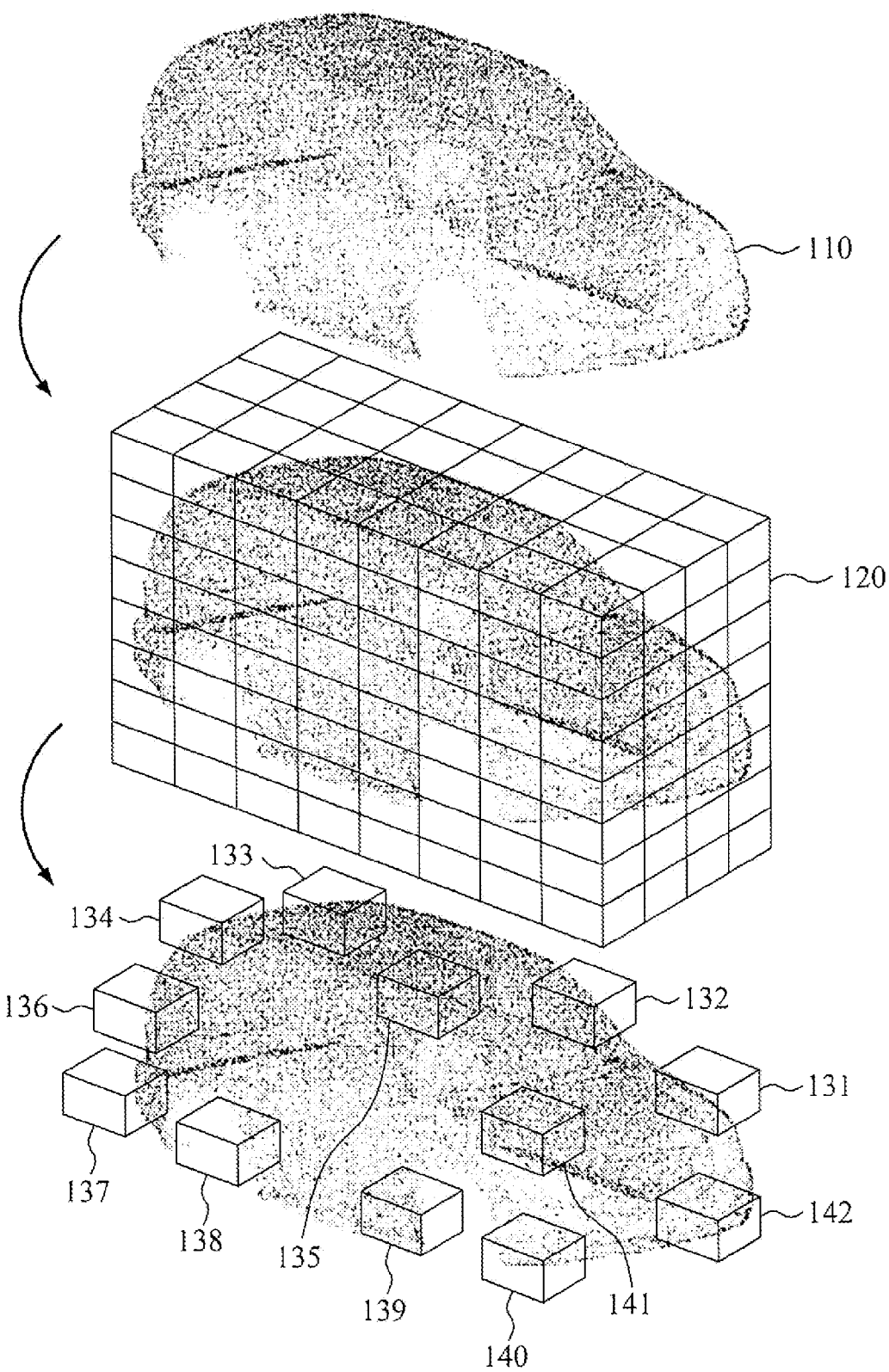
FIG. 1 is a diagram illustrating a method of extracting a feature region from a point cloud according to at least one example embodiment.

Example embodiments will now be described more fully with reference to the accompanying drawings. Many alternate forms may be embodied and example embodiments should not be construed as limited to example embodiments set forth herein. In the drawings, like reference numerals refer to like elements.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Specific details are provided in the following description to provide a thorough understanding of example embodiments. However, it will be understood by one of ordinary skill in the art that example embodiments may be practiced without these specific details. For example, systems may be shown in block diagrams so as not to obscure the example embodiments in unnecessary detail. In other instances, well-known processes, structures and techniques may be shown without unnecessary detail in order to avoid obscuring example embodiments.

In the following description, illustrative embodiments will be described with reference to acts and symbolic representations of operations (e.g., in the form of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using existing hardware in existing electronic systems (e.g., a 3D display device). Such existing hardware may include one or more Central Processing Units (CPUs), digital signal processors (DSPs), application-specific-integrated-circuits, field programmable gate arrays (FPGAs) computers or the like.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, a processor or processors may be programmed to perform the necessary tasks, thereby being transformed into special purpose processor(s) or computer(s).

FIG. 1 is a diagram illustrating a method of extracting a feature region from a point cloud according to at least one example embodiment.

A point cloud may refer to a set of points in an arbitrary coordinate system. For example, the point cloud may be a set of a plurality of points in a three-dimensional (3D) coordinate system. In the 3D coordinate system, points may be defined by x, y and z coordinates, and may be distributed on an external surface of a 3D object that is to be represented. The point cloud may be generated, for example, using a 3D scanner, and the like.

A feature region may refer to a region that may include a feature point. The feature point may refer to a point extracted from an image. A portion of feature points may be repeatedly extracted from an image, while remaining unaffected by a size, a viewpoint, an illumination change, and the like of the image. Hereinafter, a feature region may refer to a portion of a given point cloud having a probability greater than a threshold probability of including a feature point.

Referring to FIG. 1, a feature region extraction apparatus may divide a point cloud 110 into a plurality of regions 120, and may extract at least one feature region, for example, feature regions 131, 132, 133, 134, 135, 136, 137, 138, 139, 140, 141, and 142, from among the regions 120. The feature region extraction apparatus may execute a program implemented in software and stored in a memory, using a processor and a memory, or may perform a function implemented in hardware, using a hardware accelerator (HWA), a field-programmable gate array (FPGA), and the like. Also, the feature region extraction apparatus may both execute the program and perform the function.

Each of the regions 120 may be referred to as a voxel. A voxel may be an element representing a value of an area in 3D space, and may correspond to a pixel representing a value in two-dimensional (2D) space. For example, the feature region extraction apparatus may generate a voxel grid to cover the point cloud 110, and may extract at least one voxel corresponding to a feature region from the voxel grid.

The feature region extraction apparatus may extract feature points exclusively from the extracted feature regions 131 to 142, instead of from all of the regions 120 of the point cloud 110. Accordingly, the feature region extraction apparatus may reduce a number of operations used to extract a feature point. As will be described, the feature region extraction apparatus may perform a feature point extraction algorithm with a reduced number of operations. By reducing the number of operations, computing power is saved. Accordingly, the feature region extraction apparatus extract a feature point with better performance.

The extracted feature points may be used for 3D matching, 3D object recognition, and the like. For example, using the extracted feature points, performance of 3D matching in a light field display, and 3D image processing may be enhanced. At least one example embodiment may be applicable to an image signal processor of a camera, a light field display, a user interface of a smartphone, and the like.

Figure 2:
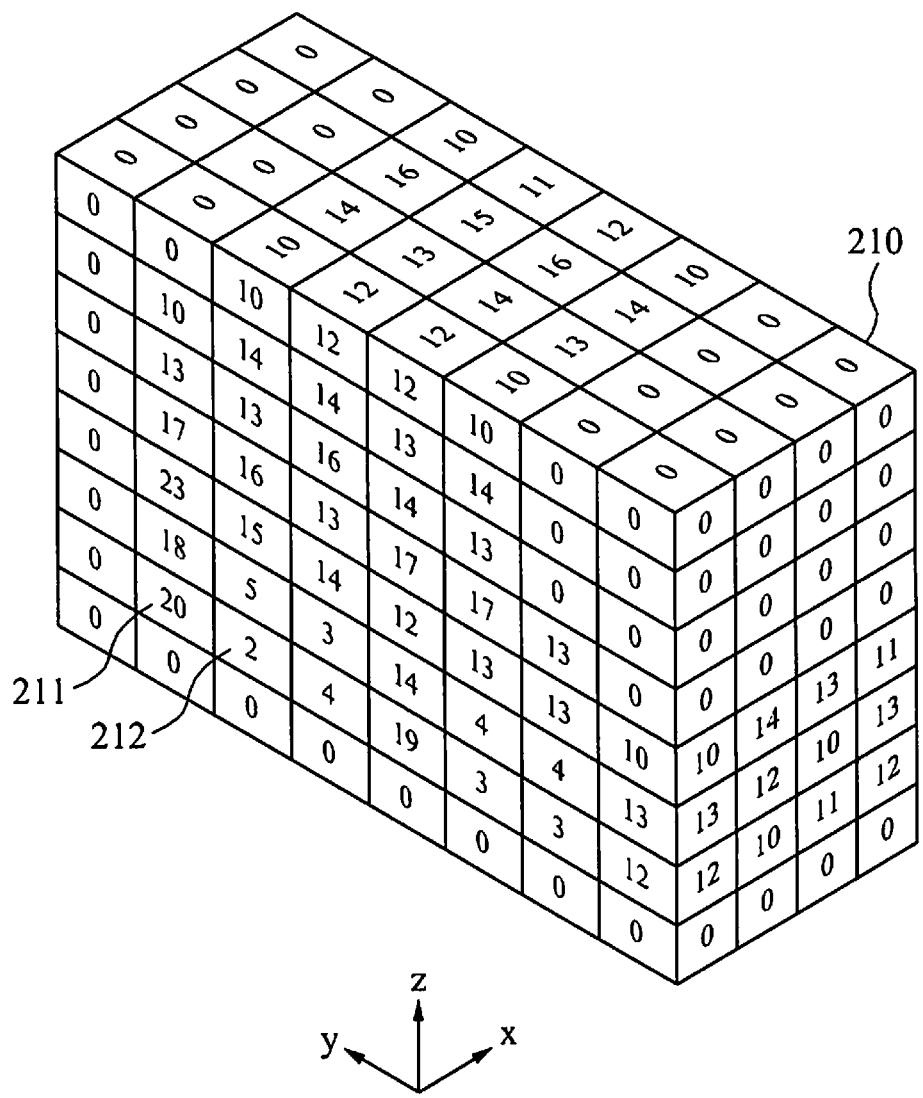
FIG. 2 is a diagram illustrating a point intensity-based voxel grid according to at least one example embodiment.

FIG. 2 is a diagram illustrating a point intensity-based voxel grid according to at least one example embodiment.

Referring to FIG. 2, a feature region extraction apparatus according to an example embodiment may generate a voxel grid 210, and may set an intensity to each of voxels in the voxel grid 210. For example, an intensity of an arbitrary voxel may be proportional to a mass of points included in the arbitrary voxel. Hereinafter, an intensity of a voxel may be referred to as a "voxel intensity" or a "point intensity."

For example, when points in the point cloud have an equal mass, an intensity of an arbitrary voxel may be defined as a number of points in the arbitrary voxel. In this example, a voxel intensity may be calculated as shown in Equation 1 below.

$$VI^0(i, j, k) = \sum_{\forall p \in P} \begin{cases} 1, & \text{if } p \in V^0(i, j, k) \\ 0, & \text{otherwise} \end{cases} \quad \text{[Equation 1]}$$

In Equation 1, P denotes a point cloud, and p denotes a point. Additionally, $V^0(i, j, k)$ denotes an (i, j, k)-th voxel at a level 0, and $VI^0(i, j, k)$ denotes a voxel intensity of the voxel $V^0(i, j, k)$. A level will be further described below.

To set a voxel intensity of each of the voxels in the voxel grid 210, the feature region extraction apparatus may explore points in a point cloud. The feature region extraction apparatus may increase a voxel intensity of a voxel containing a point being explored.

A voxel intensity of each of the voxels in the voxel grid 210 may be associated with a degree to which points in a point cloud are concentrated. For example, a voxel 211 may include 20 points, due to its voxel intensity of "20." Additionally, a voxel 212 may include two points, due to its voxel intensity of "2." The voxel intensity of the voxel 211 is greater than the voxel intensity of the voxel 212 and accordingly, points in the voxel 211 may be more densely concentrated than points in the voxel 212.

The feature region extraction apparatus may generate a point intensity-based voxel grid, and may enable voxel-based signal processing based on the point intensity-based voxel grid. The feature region extraction apparatus may perform an operation on a feature point in 3D space and accordingly, a 3D object may not need to be projected onto a 2D image to perform an operation on a predetermined and/or selected feature point. Accordingly, the feature region extraction apparatus may extract a feature point with a higher reliability, because the feature region extraction apparatus is not affected by projection distortion.

FIGS. 3 through 8 are diagrams illustrating a discrete wavelet transform (DWT) according to at least one example embodiment.

Figure 3:
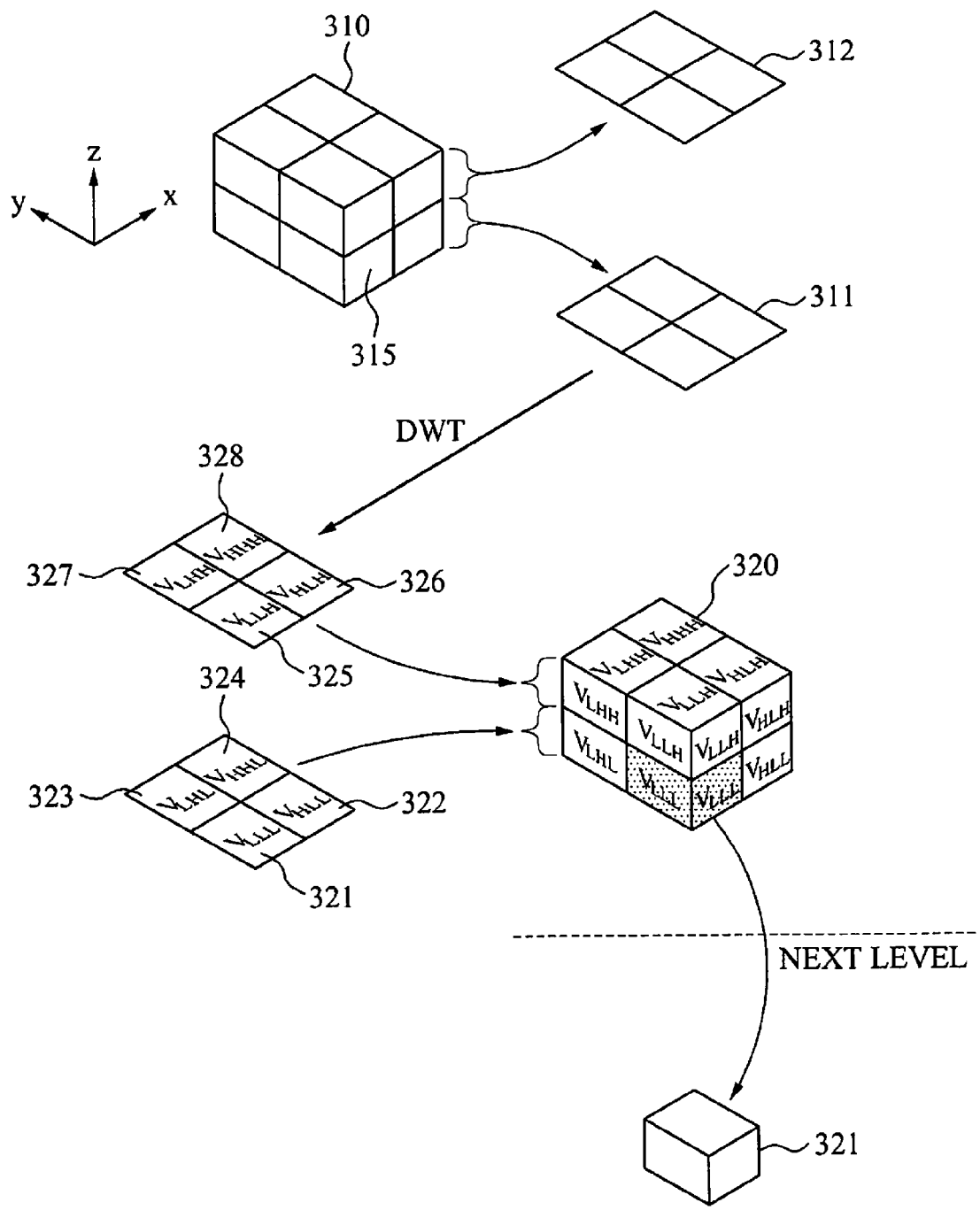
FIGS. 3 through 8 are diagrams illustrating a discrete wavelet transform (DWT) according to at least one example embodiment.

Referring to FIG. 3, a feature region extraction apparatus according to at least one example embodiment may generate a hierarchical structure based on a rate of change for a point cloud, using the DWT. The DWT may be a transform for which wavelets are discretely sampled. A wavelet may be a wave-like oscillation with an amplitude that begins at zero, increases, and then decreases back to zero. Wavelets may have specific properties that make wavelets useful for signal processing. The DWT may capture a frequency component and a location component. The feature region extraction apparatus may use, for example, a Haar wavelet transform among various DWTs.

The feature region extraction apparatus may apply a DWT to a predetermined and/or selected number of neighboring voxels. For example, referring to FIG. 3, the feature region extraction apparatus may apply a DWT to eight neighboring voxels 310. The eight neighboring voxels 310 may be classified into voxels 311 of a first layer and voxels 312 of a second layer. When the DWT is applied to the voxels 311 and 312, a high value and a low value of a rate of change for each of an x-axis, a y-axis, and a z-axis relative to a reference voxel 315 may be set.

For example, when the DWT is applied to the voxels 311 and 312, a low frequency component and a high frequency component may be calculated based on an intensity of each of the voxels 311 and 312. A voxel $V_{LLL}$ 321 may have a feature value indicating a low frequency component in an x-axis direction, a low frequency component in a y-axis direction, and a low frequency component in a z-axis direction. A voxel $V_{HLL}$ 322 may have a feature value indicating a high frequency component in the x-axis direction, a low frequency component in the y-axis direction, and a low frequency component in the z-axis direction. A voxel $V_{LHL}$ 323 may have a feature value indicating a low frequency component in the x-axis direction, a high frequency component in the y-axis direction, and a low frequency component in the z-axis direction. A voxel $V_{HHL}$ 324 may have a feature value indicating a high frequency component in the x-axis direction, a high frequency component in the y-axis direction, and a low frequency component in the z-axis direction.

Additionally, a voxel $V_{LLH}$ 325 may have a feature value indicating a low frequency component in the x-axis direction, a low frequency component in the y-axis direction, and a high frequency component in the z-axis direction. A voxel $V_{HLH}$ 326 may have a feature value indicating a high frequency component in the x-axis direction, a low frequency component in the y-axis direction, and a high frequency component in the z-axis direction. A voxel $V_{LHH}$ 327 may have a feature value indicating a low frequency component in the x-axis direction, a high frequency component in the y-axis direction, and a high frequency component in the z-axis direction. A voxel $V_{HHH}$ 328 may have a feature value indicating a high frequency component in the x-axis direction, a high frequency component in the y-axis direction, and a high frequency component in the z-axis direction.

Hereinafter, each of the voxels $V_{LLL}$ 321 to $V_{HHH}$ 328 may be referred to as "subband."

Figure 4:
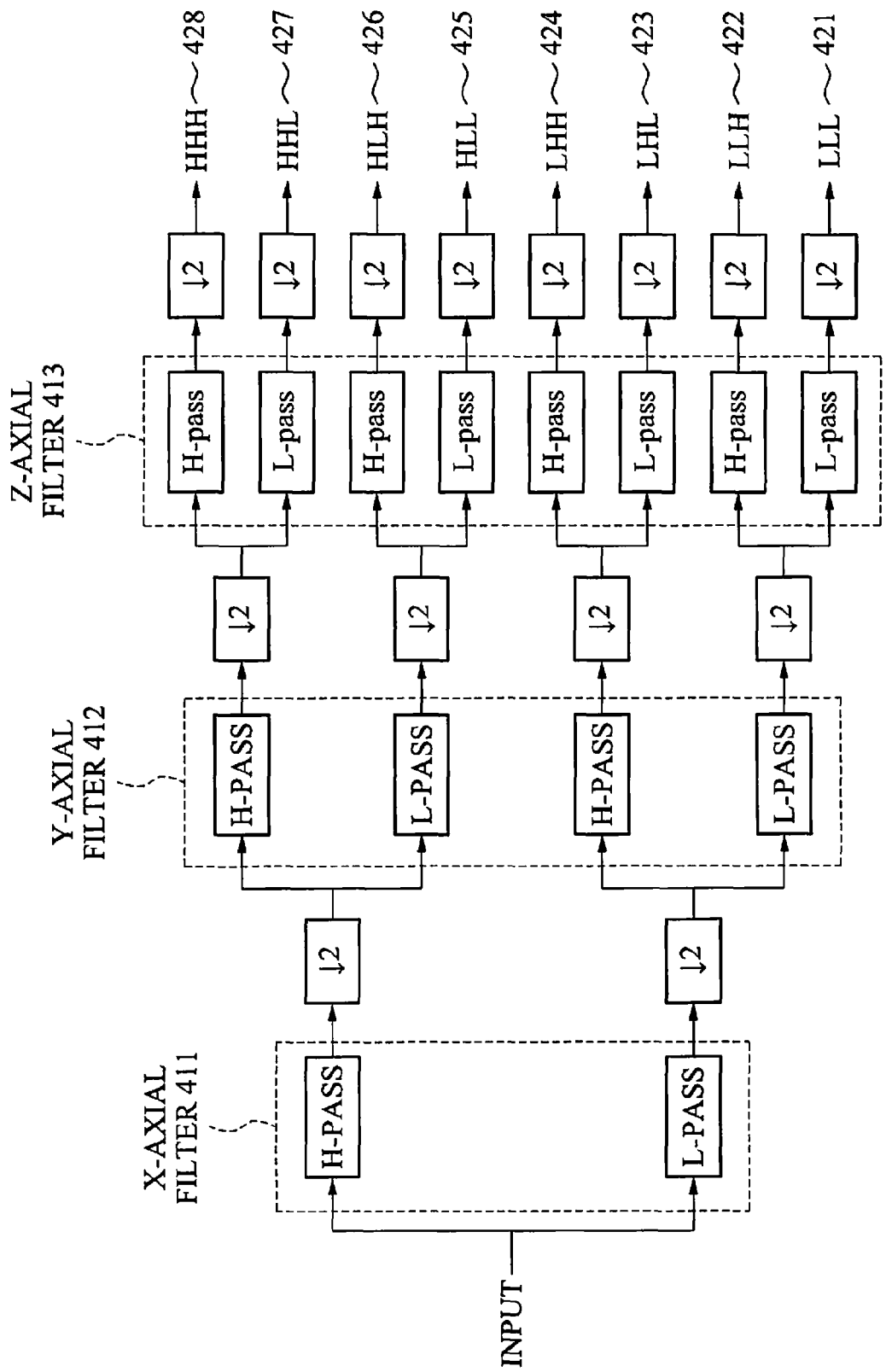

FIG. 4 illustrates a concept of the DWT. The DWT may be applied to 3D voxels and accordingly, may be referred to as a "3D DWT."

Referring to FIG. 4, an input signal may be output as eight features through an x-axial filter 411, a y-axial filter 412, and a z-axial filter 413. For example, a feature LLL 421 may include a low frequency component in an x-axis direction, a low frequency component in a y-axis direction, and a low frequency component in a z-axis direction. A feature LLH 422 may include a low frequency component in the x-axis direction, a low frequency component in the y-axis direction, and a high frequency component in the z-axis direction. A feature LHL 423 may include a low frequency component in the x-axis direction, a high frequency component in the y-axis direction, and a low frequency component in the z-axis direction. Additionally, a feature LHH 424 may include a low frequency component in the x-axis direction, a high frequency component in the y-axis direction, and a high frequency component in the z-axis direction.

Additionally, a feature HLL 425 may include a high frequency component in the x-axis direction, a low frequency component in the y-axis direction, and a low frequency component in the z-axis direction. A feature HLH 426 may include a high frequency component in the x-axis direction, a low frequency component in the y-axis direction, and a high frequency component in the z-axis direction. A feature HHL 427 may include a high frequency component in the x-axis direction, a high frequency component in the y-axis direction, and a low frequency component in the z-axis direction. A feature HHH 428 may include a high frequency component in the x-axis direction, a high frequency component in the y-axis direction, and a high frequency component in the z-axis direction.

The features LLL 421, LLH 422, LHL 423, and LHH 424 may correspond to the voxels $V_{LLL}$ 321, $V_{LLH}$ 325, $V_{LHL}$ 323, and $V_{LHH}$ 327 of FIG. 3, respectively. Additionally, the features HLL 425, HLH 426, HHL 427, and HHH 428 may correspond to the voxels $V_{HLL}$ 322, $V_{HLH}$ 326, $V_{HHL}$ 324, and $V_{HHH}$ 328 of FIG. 3, respectively.

Referring back to FIG. 3, eight neighboring voxels 320 obtained by the DWT may include seven high frequency component voxels, that is, the voxels $V_{HLL}$ 322 to $V_{HHH}$ 328, based on the voxel $V_{LLL}$ 321. Because the voxel $V_{HLL}$ 322 includes the high frequency component in the x-axis direction, the voxel $V_{HLL}$ 322 may be placed in a position in which an x-coordinate increases from the voxel $V_{LLL}$ 321. Because the voxel $V_{LHL}$ 323 includes the high frequency component in the y-axis direction, the voxel $V_{LHL}$ 323 may be placed in a position in which a y-coordinate increases from the voxel $V_{LLL}$ 321. Because the voxel $V_{HHL}$ 324 includes the high frequency components in the x-axis direction and the y-axis direction, the voxel $V_{HHL}$ 324 may be placed in a position in which an x-coordinate and a y-coordinate increase from the voxel $V_{LLL}$ 321.

Additionally, because the voxel $V_{LLH}$ 325 includes the high frequency component in the z-axis direction, the voxel $V_{LLH}$ 325 may be placed in a position in which a z-coordinate increases from the voxel $V_{LLL}$ 321. Because the voxel $V_{HLH}$ 326 includes the high frequency components in the x-axis direction and the z-axis direction, the voxel $V_{HLH}$ 326 may be placed in a position in which an x-coordinate and a z-coordinate increase from the voxel $V_{LLL}$ 321. Because the voxel $V_{LHH}$ 327 includes the high frequency components in the y-axis direction and the z-axis direction, the voxel $V_{LHH}$ 327 may be placed in a position in which a y-coordinate and a z-coordinate increase from the voxel $V_{LLL}$ 321. Because the voxel $V_{HHH}$ 328 includes the high frequency components in the x-axis direction, the y-axis direction, and the z-axis direction, the voxel $V_{HHH}$ 328 may be placed in a position in which an x-coordinate, a y-coordinate and a z-coordinate increase from the voxel $V_{LLL}$ 321.

The feature region extraction apparatus may use the $V_{LLL}$ voxel 321 among the eight neighboring voxels 320 to perform a DWT of a next level, which may indicate downsampling of a size of a voxel to ⅛. Due to an increase in a level, a voxel may represent a rate of change for a wider region.

A value of the voxel $V_{LLL}$ 321 may be a representative value among values of the eight neighboring voxels 310, which will be further described below. For example, the value of the voxel $V_{LLL}$ 321 may be an average of intensities of the eight neighboring voxels 310. The feature region extraction apparatus may generate a hierarchical structure by using representative values among values of a DWT in a lower level to perform a DWT in a next higher level.

Figure 5:
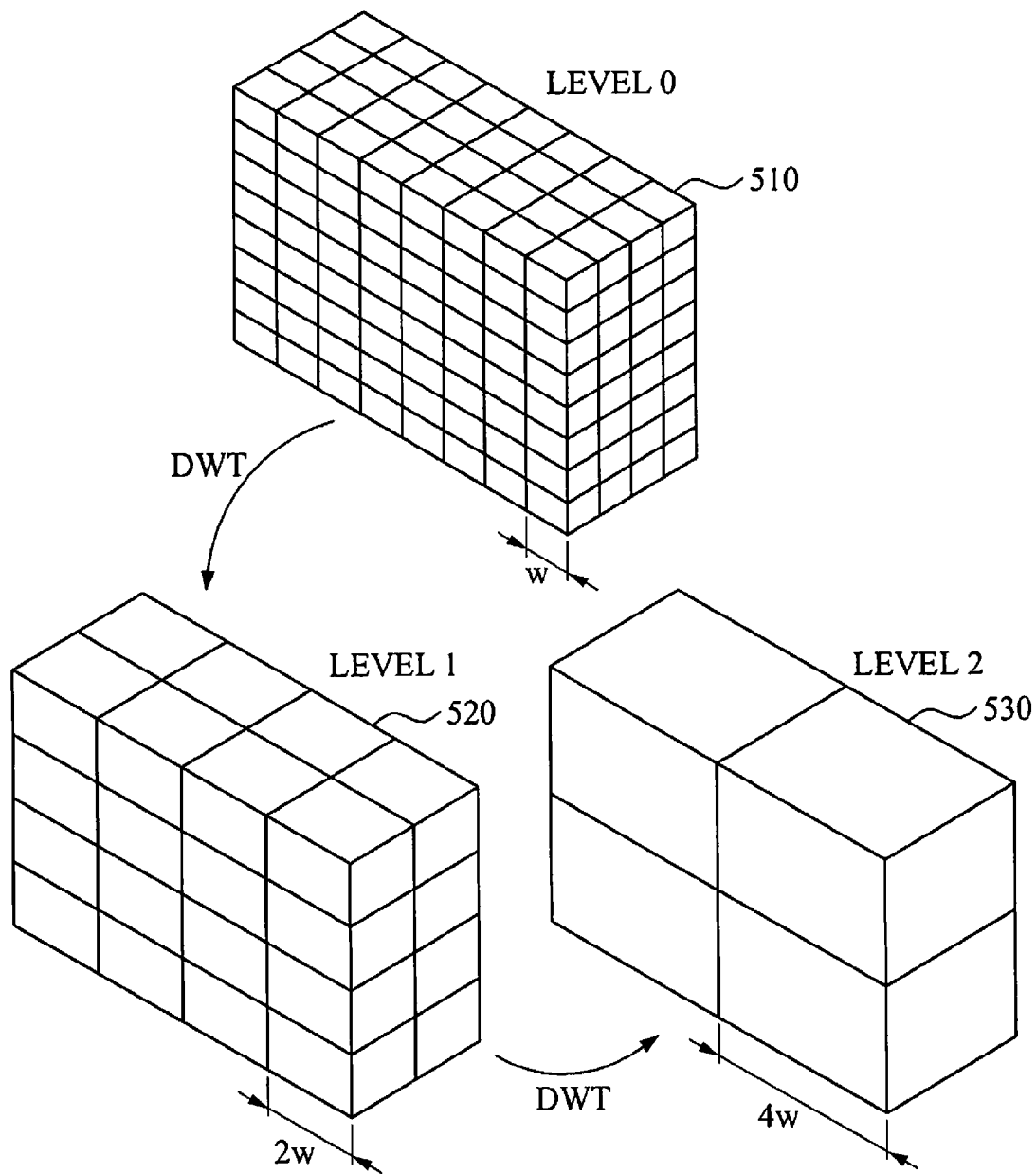

Referring to FIG. 5, the feature region extraction apparatus may set a level of voxels 510 to "0," and may perform a DWT. A single axis of each of the voxels 510 may have a length of "w." The feature region extraction apparatus may propagate, to a level 1, representative values relative to a feature LLL among values obtained by the DWT at the level 0. A single axis of each of voxels 520 in the level 1 may have a length of "2w." The feature region extraction apparatus may perform a DWT at the level 1, and may propagate, to a level 2, representative values relative to a feature LLL among values obtained by the DWT at the level 1. A single axis of each of voxels 530 in the level 2 may have a length of "4w."

When a level increases, a length of a single axis of each of voxels may increase, and a number of voxels forming a voxel grid in the level may decrease. Additionally, when the level increases, a size of a region covered by a single voxel may increase.

Figure 6:
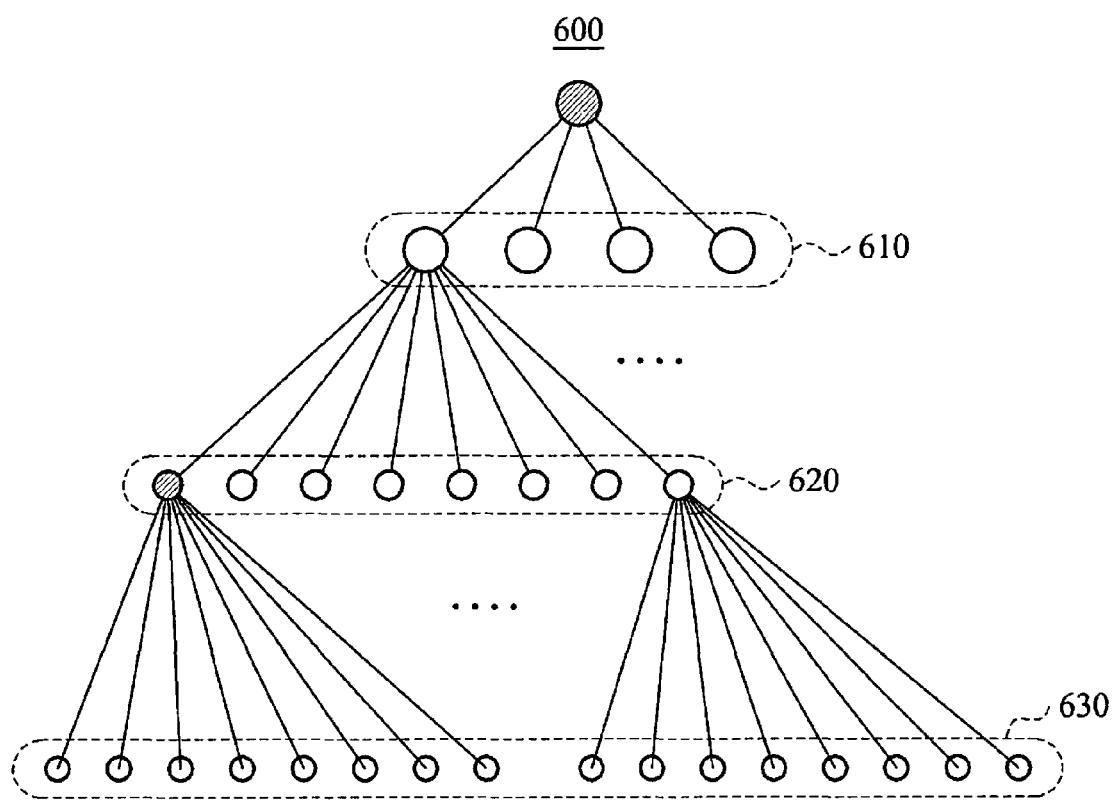

Referring to FIG. 6, a hierarchical structure 600 having a plurality of levels as a result of iterating a DWT may be generated. The hierarchical structure 600 may be represented in the form of a tree. Nodes 610 with a depth of "1" may correspond to the voxels 530 in the level 2 of FIG. 5, and nodes 620 with a depth of "2" may correspond to the voxels 520 in the level 1 of FIG. 5. Additionally, nodes 630 with a depth of "3" may correspond to the voxels 510 in the level 0 of FIG. 5.

The feature region extraction apparatus may perform hierarchical exploration from a wide region to a narrow region, using the generated hierarchical structure 600, which will be further described below. For example, the feature region extraction apparatus may start exploration of a wide region, and may exclude, in advance from a target to be explored, portions of the wide region that have a low possibility to include a feature point. In this example, the excluded portions may also be excluded from exploration of a narrow region and accordingly, a total amount of time for exploration to extract a feature region may be reduced.

Figure 7:
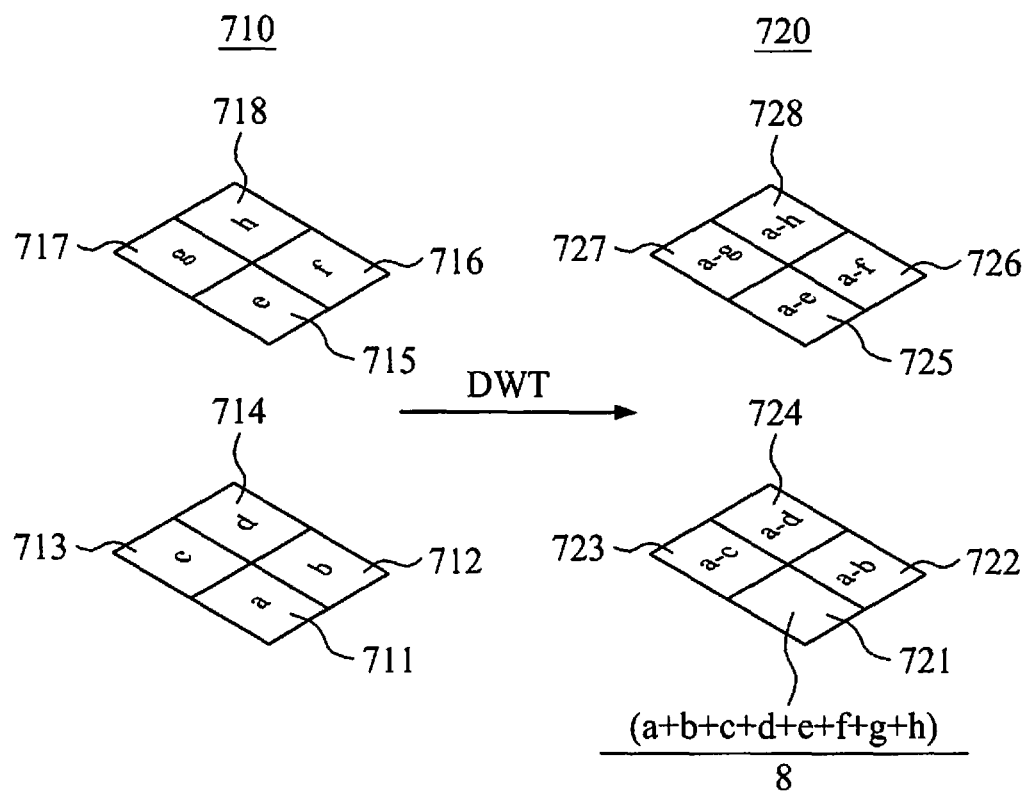

Referring to FIG. 7, the feature region extraction apparatus may perform a DWT, based on an intensity of each of eight neighboring voxels 710. For example, a first voxel 711, a second voxel 712, a third voxel 713 and a fourth voxel 714 among the eight neighboring voxels 710 may have an intensity of "a," an intensity of "b," an intensity of "c," and an intensity of "d," respectively. Additionally, a fifth voxel 715, a sixth voxel 716, a seventh voxel 717, and an eighth voxel 718 among the eight neighboring voxels 710 may have an intensity of "e," an intensity of "f," an intensity of "g," and an intensity of "h," respectively.

A value of a voxel $V_{LLL}$ 721 may be calculated to be "(a+b+c+d+e+f+g+h)/8." A value of a voxel $V_{HLL}$ 722 may be calculated to be "(a-b)." A value of a voxel $V_{LHL}$ 723 may be calculated to be "(a-c)." A voxel $V_{HHL}$ 724 may be calculated to be "a-d." A voxel $V_{LLH}$ 725 may be calculated to be "(a-e)." A voxel $V_{HLH}$ 726 may be calculated to be "(a-f)." A voxel $V_{LHH}$ 727 may be calculated to be "(a-g)." A voxel $V_{HHH}$ 728 may be calculated to be "(a-h)."

Figure 8:
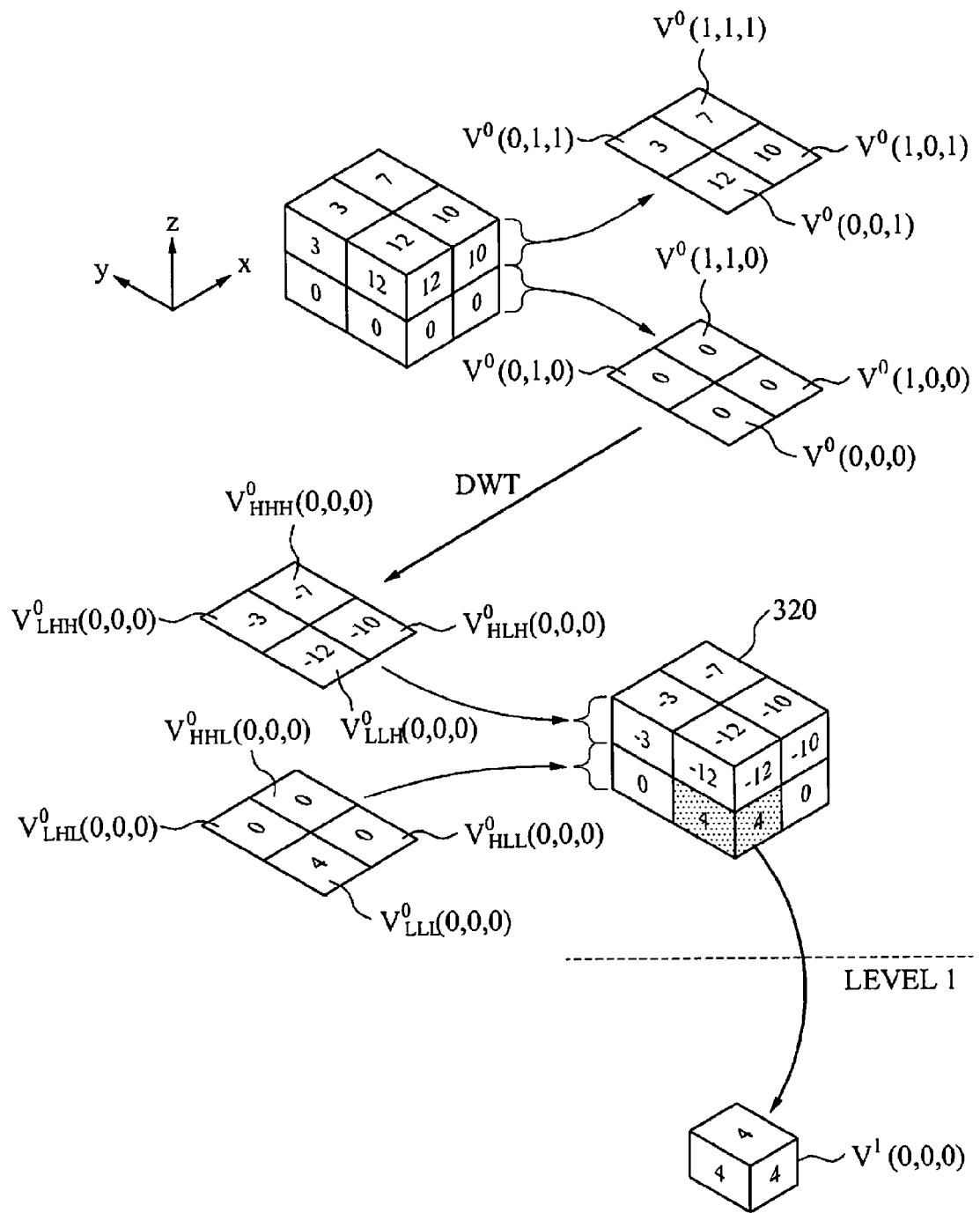

FIG. 8 illustrates a process of performing a DWT on voxels $V^0(0, 0, 0)$, $V^0(1, 0, 0)$, $V^0(0, 1, 0)$, $V^0(1, 1, 0)$, $V^0(0, 0, 1)$, $V^0(1, 0, 1)$, $V^0(0, 1, 1)$, and $V^0(1, 1, 1)$ among the voxels in the voxel grid 210 of FIG. 2. In FIG. 8, $V^1(i, j, k)$ denotes an (i, j, k)-th voxel in a level l. Each of the voxels $V^0(0, 0, 0)$, $V^0(1, 0, 0)$, $V^0(0, 1, 0)$, and $V^0(1, 1, 0)$ may have an intensity of "0." Additionally, the voxel $V^0(0, 0, 1)$ may have an intensity of "12," the voxel $V^0(1, 0, 1)$ may have an intensity of "10," the voxel $V^0(0, 1, 1)$ may have an intensity of "3," and the voxel $V^0(1, 1, 1)$ may have an intensity of "7."

As a result of the DWT, a voxel $V^0_{LLL}(0, 0, 0)$ may have a value of "4," and each of voxels $V^0_{HLL}(0, 0, 0)$, $V^0_{LHL}(0, 0, 0)$, and $V^0_{HHL}(0, 0, 0)$ may have a value of "0." Additionally, a voxel $V^0_{LLH}(0, 0, 0)$ may have a value of "−12," a voxel $V^0_{HLH}(0, 0, 0)$ may have a value of "−10," a voxel $V^0_{LHH}(0, 0, 0)$ may have a value of "−3," and a voxel $V^0_{HHH}(0, 0, 0)$ may have a value of "−7." The voxels $V^0_{LLL}(0, 0, 0)$, $V^0_{HLL}(0, 0, 0)$, $V^0_{LHL}(0, 0, 0)$, and $V^0_{HHL}(0, 0, 0)$ represent a subband of a feature LLL, a subband of a feature HLL, a subband of a feature LHL, and a subband of a feature HHL, respectively, based on the voxel $V^0(0, 0, 0)$. Additionally, the voxels $V^0_{LLH}(0, 0, 0)$, $V^0_{HLH}(0, 0, 0)$, $V^0_{LHH}(0, 0, 0)$, and $V^0_{HHH}(0, 0, 0)$ represent a subband of a feature LLH, a subband of a feature HLH, a subband of a feature LHH, and a subband of a feature HHH, respectively, based on the voxel $V^0(0, 0, 0)$.

For example, the feature region extraction apparatus may propagate the value of the voxel $V^0_{LLL}(0, 0, 0)$ to a next level, that is, a level 1. An intensity of a voxel $V^1(0, 0, 0)$ in the level 1 may be "4" that is equal to the value of the voxel $V^0_{LLL}(0, 0, 0)$. A voxel intensity at a level l equal to or higher than "1" may be represented as shown in Equation 2 below.

$$VI^l(i,j,k) = V^{l-1}_{LLL}(2i, 2j, 2k)$$ [Equation 2]

Figure 9:
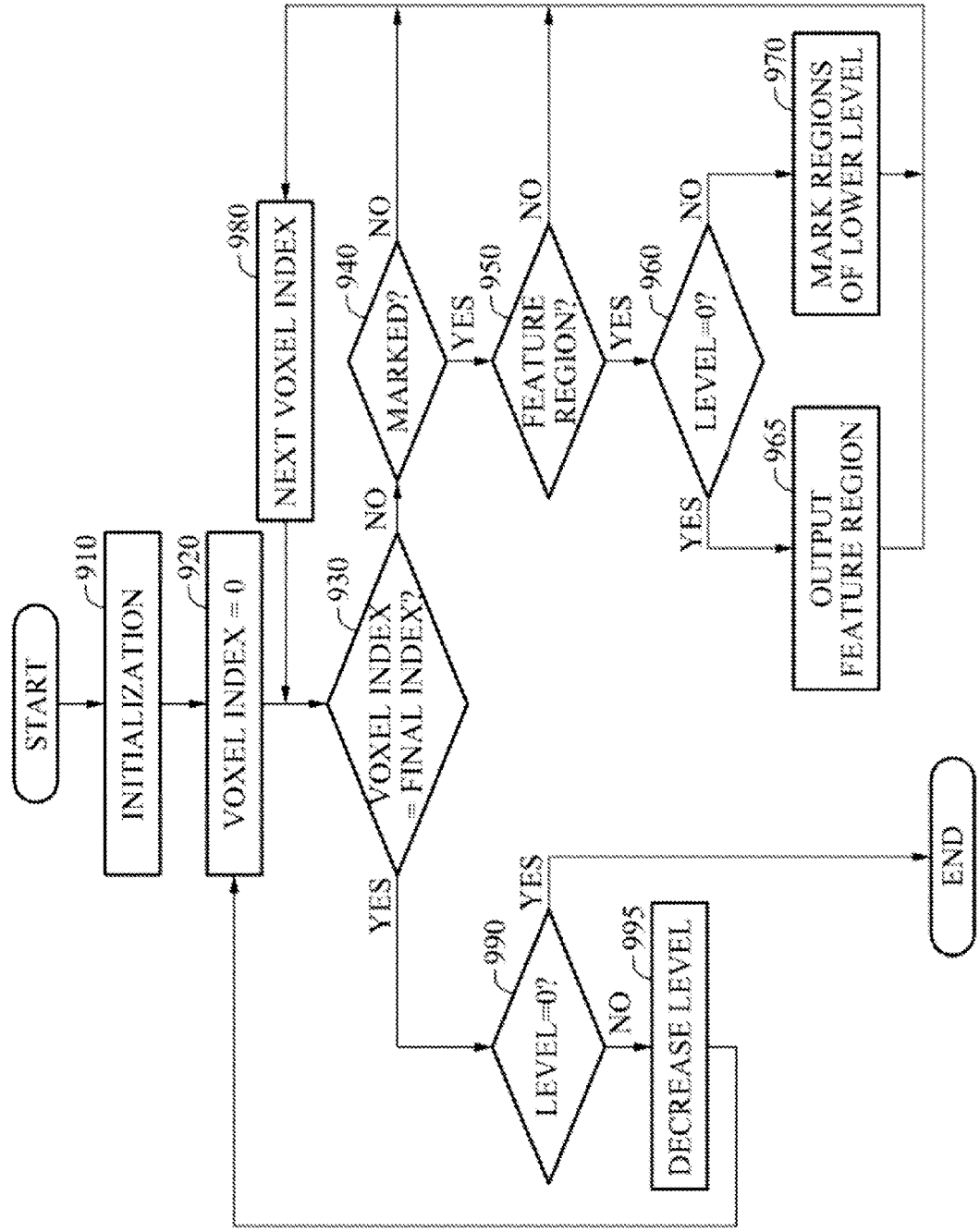
FIG. 9 is a flowchart illustrating a method of extracting a feature region based on a hierarchical structure according to at least one example embodiment.

FIG. 9 is a flowchart illustrating a method of extracting a feature region based on a hierarchical structure according to at least one example embodiment.

Referring to FIG. 9, a feature region extraction apparatus according to at least one example embodiment may extract a feature region based on a generated hierarchical structure. In operation 910, the feature region extraction apparatus may perform initialization. For example, the feature region extraction apparatus may set a parameter level indicating a level of a voxel to a highest level. In operation 920, the feature region extraction apparatus may set, to "0," a parameter voxel index indicating an index of a voxel to start iteration in a level. The voxel index may sequentially represent values of "(i, j, k)=(0, 0, 0)" to "(i, j, k)=(x-axis size, y-axis size, z-axis size in a voxel grid)", and may be irrelevant to a sequence of the values.

Figure 10:
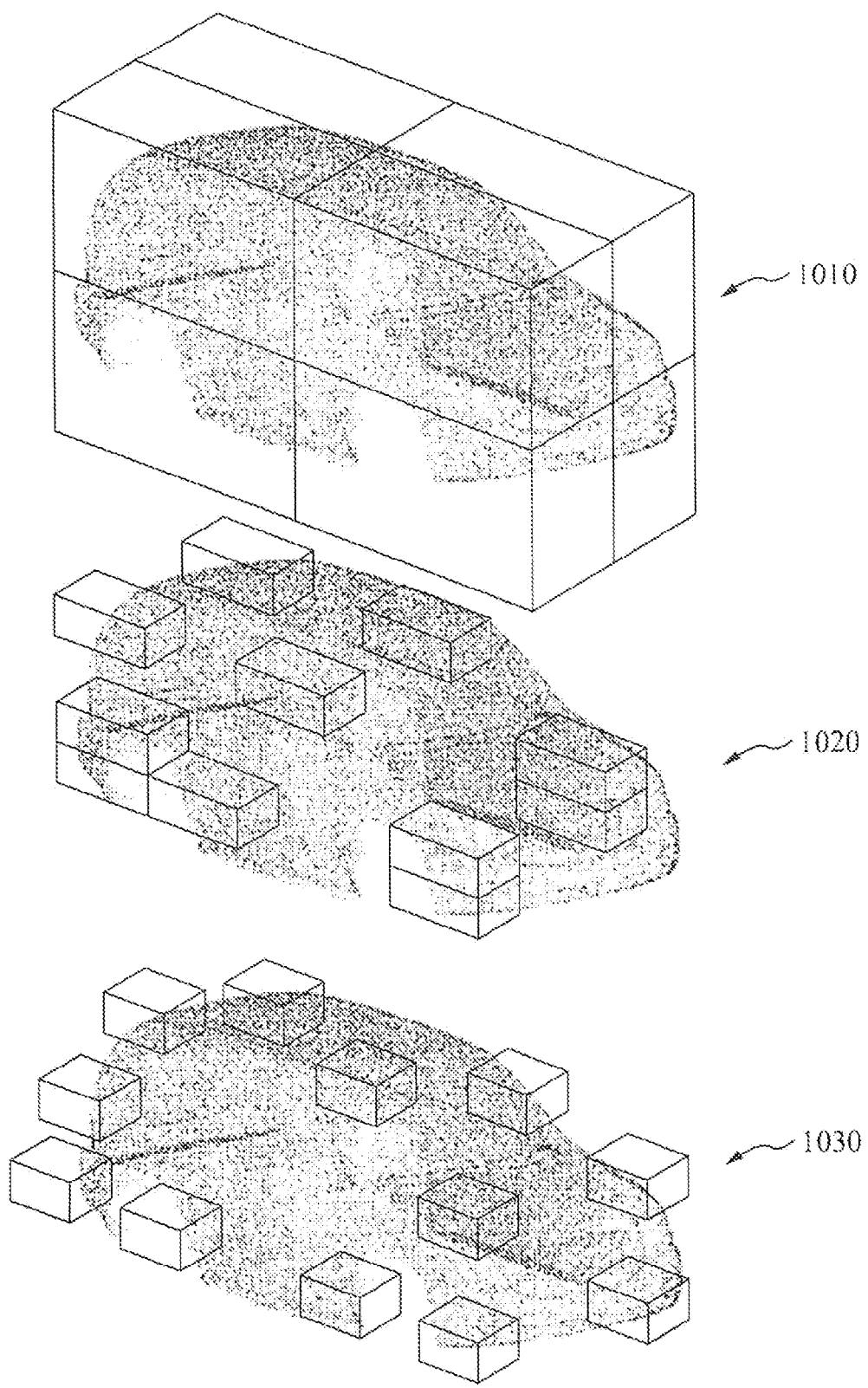
FIG. 10 is a diagram illustrating a method of extracting a feature region based on a hierarchical structure according to at least one example embodiment.

In operation 930, the feature region extraction apparatus may determine whether a voxel index is a final index indicating an end of the iteration, to terminate the iteration. For example, when the voxel index is determined not to be the final index, the feature region extraction apparatus may determine whether a voxel corresponding to the voxel index is marked in operation 940. In this example, all voxels may be marked in the highest level. Referring to FIG. 10, a level 2 may be set as the highest level, and all voxels 1010 in the level 2 may be marked. When the voxel is determined to be unmarked in operation 940, the feature region extraction apparatus may update the voxel index to be a next voxel index in operation 980.

When the voxel is determined to be marked in operation 940, the feature region extraction apparatus may determine whether the voxel is a feature region in operation 950. For example, the feature region extraction apparatus may calculate an expected value of a feature region based on subbands of voxels in a higher level. When the expected value is equal to or greater than a threshold, the feature region extraction apparatus may determine the voxel as a feature region. A scheme of determining whether a voxel corresponding to a voxel index is a feature region in operation 950 will be further described with reference to FIGS. 11 through 16.

When the voxel is determined to be the feature region, the feature region extraction apparatus may determine whether a level is "0" in operation 960. When the level is determined not to be "0," the feature region extraction apparatus may mark voxels in a lower level of the voxel in operation 970. For example, a single voxel in a higher level may correspond to eight voxels in a next lower level. The feature region extraction apparatus may mark eight voxels in a next lower level. Referring to FIG. 10, voxels 1020 in a level 1 may be determined as a feature region. In this example, the feature region extraction apparatus may mark voxels in a lower level of each of the voxels 1020.

When the voxel is determined not to be the feature region, the feature region extraction apparatus may update the voxel index to be the next voxel index in operation 980. The feature region extraction apparatus may not mark voxels in the lower level of the voxel that is determined not to be the feature region and accordingly, the voxels in the lower level may be excluded from a target to be explored.

When the level is determined to be "0," the feature region extraction apparatus may output the feature region in operation 965. Because the voxel is determined to be the feature region in operation 950, the feature region extraction apparatus may output the voxel. For example, referring to FIG. 10, voxels 1030 in a level 0 may be determined as a feature region. In this example, the feature region extraction apparatus may output the voxels 1030.

In operation 980, the feature region extraction apparatus may update the voxel index to be the next voxel index. The feature region extraction apparatus may repeatedly perform operations 930 to 980 until the final index. When the iteration is terminated, the voxel index may be equal to the final index. In operation 990, the feature region extraction apparatus may determine whether a level is "0." When the level is determined not to be "0," the feature region extraction apparatus may decrease the level in operation 995. The feature region extraction apparatus may repeatedly perform operations 920 to 980 at the decreased level. When the level is determined to be "0," a feature region extraction algorithm may be terminated.

At least some example embodiments may be applicable to a light field display. For example, at least some example embodiments may be applied to match 3D structures formed of multiple images, or to recognize a predetermined and/or selected portion in multiple images.

The feature region extraction apparatus may extract feature points from extracted feature regions. For example, the feature region extraction apparatus may extract a feature point from a feature region, instead of outputting the feature region in operation 965. The feature region extraction apparatus may search for a predetermined and/or selected number of neighboring points that are closest to a single point in the feature region. The feature region extraction apparatus may combine the single point with the neighboring points in a temporary set. The feature region extraction apparatus may set a temporary set corresponding to each of a plurality of points included in the feature region. The feature region extraction apparatus may calculate a central point in the temporary set, using Equation 3 shown below.

$$\bar{p} = \frac{1}{k}\sum_{i}^{k} p_i \qquad \text{[Equation 3]}$$

In Equation 3, k denotes a number of points included in a temporary set, $p_i$ denotes an i-th point in the temporary set, and $\bar{p}$ denotes a central point in the temporary set.

The feature region extraction apparatus may calculate a matrix C, based on Equation 4 shown below. The feature region extraction apparatus may calculate the matrix C, based on vectors directed from the central point toward points included in the temporary set. The matrix C may be, for example, a symmetric, positive define matrix. Additionally, by performing an eigen analysis of the matrix C, the feature region extraction apparatus may calculate an eigenvalue.

$$C = \frac{1}{k}\sum_{i=1}^{k}(p_i - \bar{p})\cdot(p_i - \bar{p})^T, \; C\cdot\bar{v}_j \qquad \text{[Equation 4]}$$
$$= \lambda_j \cdot \bar{v}_j,$$
$$j \in \{1, 2, 3\}$$

In Equation 4, k denotes a number of points included in a temporary set, $p_i$ denotes an i-th point in the temporary set, and $\bar{p}$ denotes a central point in the temporary set. Additionally, $\lambda_j$ denotes an eigenvalue, and $\bar{v}_j$ denotes an eigenvector corresponding to an eigenvalue.

The feature region extraction apparatus may extract a feature point, based on Equation 5 shown below. For example, the feature region extraction apparatus may obtain a smallest eigenvalue from each of a plurality of temporary sets. The feature region extraction apparatus may detect a temporary set having a maximum value among the smallest eigenvalues. The feature region extraction apparatus may set, as a feature point, a point corresponding to the detected temporary set.

$$fp = p_m, m = \mathrm{argmax}_t(\lambda_*^t)\lambda_*^t = \min(\lambda_1^t, \lambda_2^t, \lambda_3^t) \qquad \text{[Equation 5]}$$

where fp is the feature point in Equation 5, $(\lambda_1^t, \lambda_2^t, \lambda_3^t)$ denote eigenvalues calculated based on a t-th temporary set, and $\lambda_*^t$ denotes a smallest eigenvalue among the eigenvalues calculated based on the t-th temporary set. Additionally, m denotes an index of a temporary set having a maximum value among smallest eigenvalues, $p_m$ denotes a point corresponding to an m-th temporary set, and fp denotes a feature point.

Figure 11:
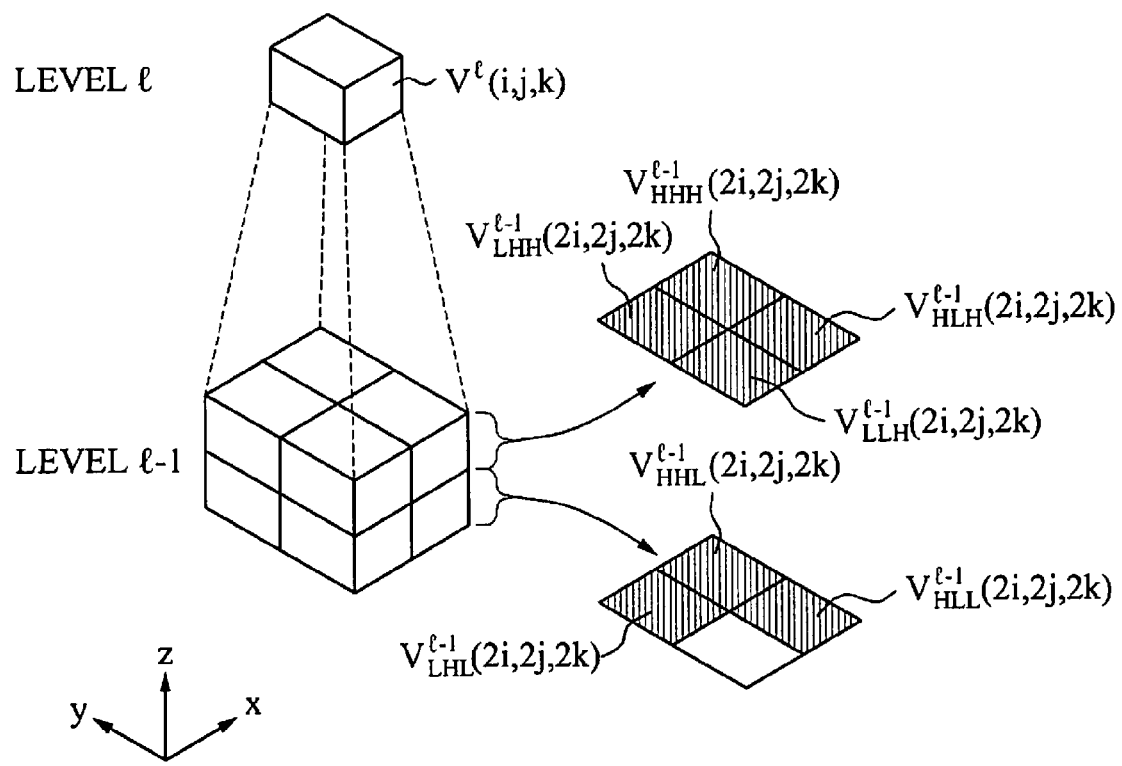
FIGS. 11 and 12 are diagrams illustrating a saliency condition according to at least one example embodiment.
Figure 12:
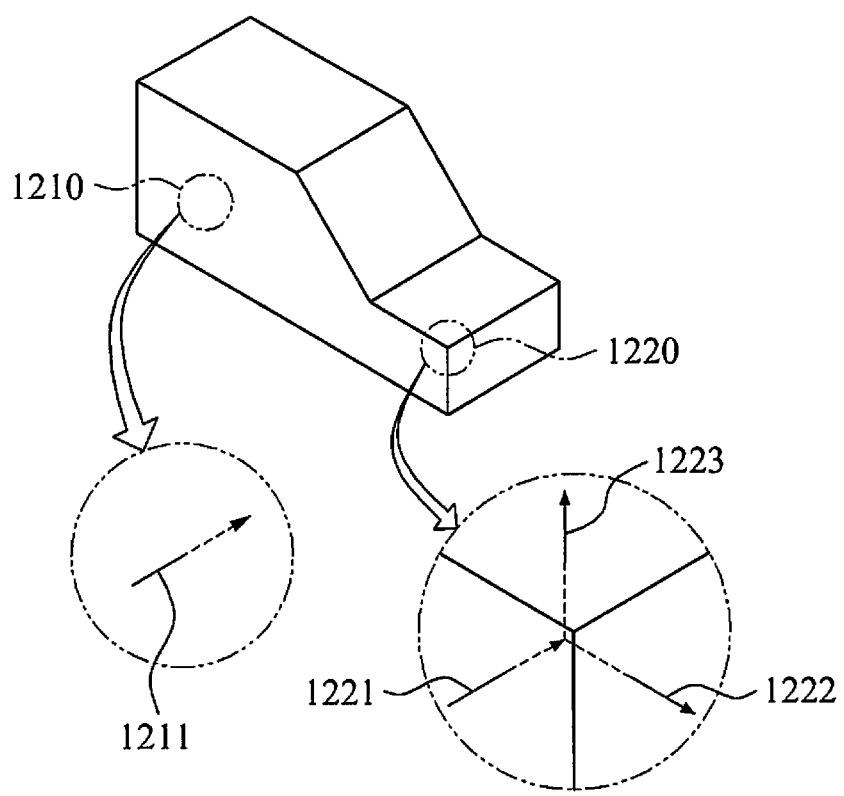

FIGS. 11 and 12 illustrate a saliency condition according to at least one example embodiment.

Referring to FIG. 11, a feature region extraction apparatus according to example embodiments may calculate the saliency condition, to determine whether a voxel is a feature region. For example, the feature region extraction apparatus may calculate the saliency condition based on Equations 6 and 7 shown below.

$$SA_{a1a2a3}(V^l(i,j,k)) = \begin{cases} 1, & \text{if } V^{l-1}_{a1a2a3}(2i,2j,2k) > threshold_1 \\ 0, & \text{otherwise} \end{cases} \qquad \text{[Equation 6]}$$

where $SA_{a1a2a3}$ is a saliency value in Equation 6, a1a2a3 denotes a variable used to indicate high frequency subbands of a voxel $V^l(i, j, k)$, and may have, for example, one of values HLL, LHL, HHL, LLH, HLH, LHH, and HHH. The feature region extraction apparatus may determine whether a value of each of the high frequency subbands of the voxel $V^l(i, j, k)$ is greater than a first threshold $threshold_1$.

$$C_{SA}(V^l(i,j,k)) = \begin{cases} 1, & \text{if } \sum_{a1,a2,a3} SA_{a1a2a3}(V^l(i,j,k)) > threshold_2 \\ 0, & \text{otherwise} \end{cases}$$ [Equation 7]

where $C_{SA}$ is a value representing the saliency condition. The feature region extraction apparatus may determine whether a number of high frequency subbands, each having a value greater than the first threshold $threshold_1$, among the high frequency subbands of the voxel $V^l(i, j, k)$ is greater than a second threshold $threshold_2$. When a number of directions in which a rate of change in intensities of points in the voxel $V^l(i, j, k)$ is greater than the first threshold $threshold_1$ is greater than the second threshold $threshold_2$, the saliency condition may be satisfied.

For example, the second threshold $threshold_2$ may be set to "2." In this example, when a number of high frequency subbands, each having a value greater than the first threshold $threshold_1$ among seven high frequency subbands of the voxel $V^l(i, j, k)$, is equal to or greater than "3," the saliency condition may be satisfied. To satisfy the saliency condition, the rate of change in intensities of points in the voxel $V^l(i, j, k)$ may need to be greater than the first threshold $threshold_1$ in at least three directions. Additionally, an object having a vertex or having a variable surface may be included in the voxel $V^l(i, j, k)$. Referring to FIG. 12, in a single direction, that is, a direction 1211, a rate of change in intensities of points in a voxel 1210 is greater than the first threshold $threshold_1$ and accordingly, a saliency condition of the voxel 1210 may not be satisfied. In three directions, that is, directions 1221, 1222, and 1223, a rate of change in intensities of points in a voxel 1220 is greater than the first threshold $threshold_1$ and accordingly, a saliency condition of the voxel 1220 may be satisfied.

Figure 13:
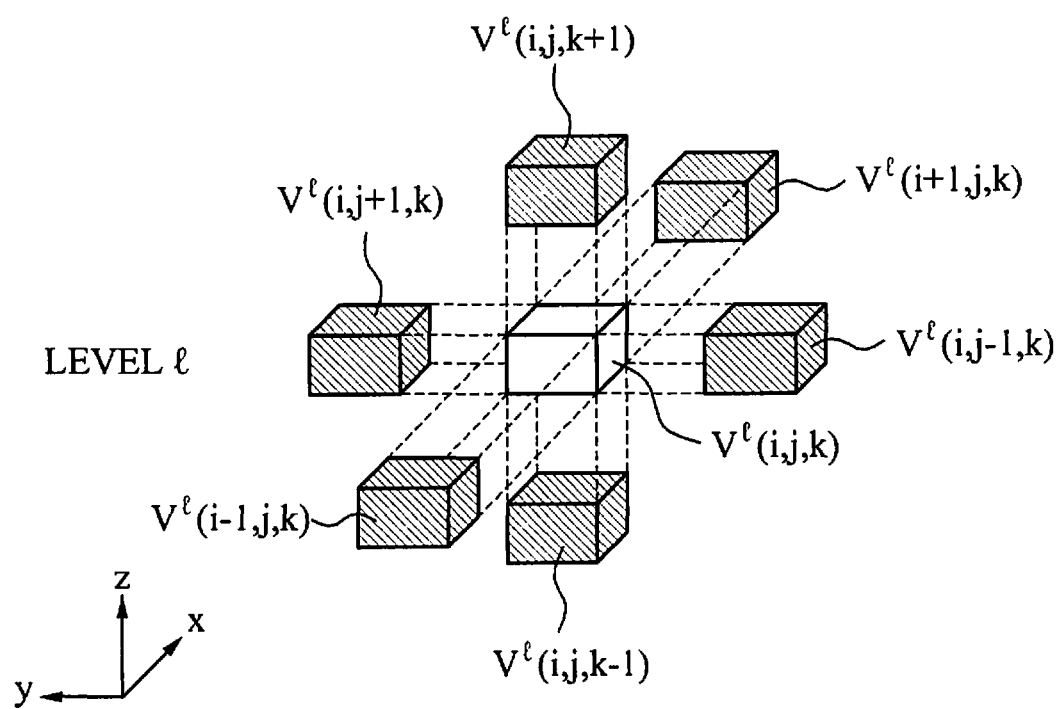
FIGS. 13 and 14 are diagrams illustrating a connectivity condition according to at least one example embodiment.
Figure 14:
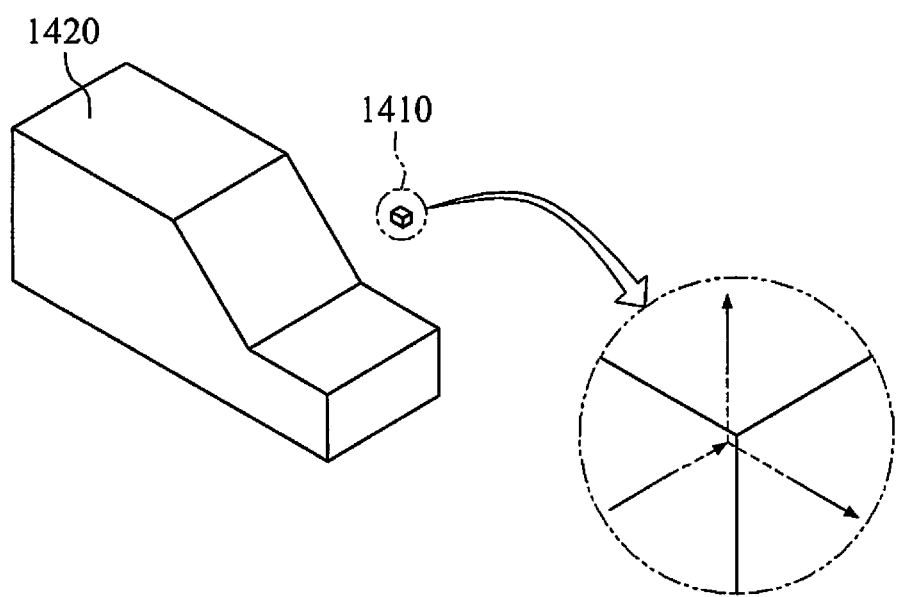

FIGS. 13 and 14 illustrate a connectivity condition according to at least one example embodiment.

Referring to FIG. 13, the feature region extraction apparatus may calculate the connectivity condition, to determine whether a voxel is a feature region. The feature region extraction apparatus may determine whether a voxel j, k) is connected to neighboring voxels. When the voxel $V^l(i, j, k)$ is not connected to the neighboring voxels, the feature region extraction apparatus may determine that the voxel $V^l(i, j, k)$ is not a feature region, despite a saliency condition of the voxel $V^l(i, j, k)$ being satisfied.

For example, referring to FIG. 14, a voxel 1410 may be generated, for example, due to noise in a point cloud. Because the voxel 1410 does not express a feature of a main object 1420, the voxel 1410 may have a low value as a feature point or a feature region. A rate of change in intensities of points in the voxel 1410 is greater than the first threshold $threshold_1$ in three directions and accordingly, a saliency condition of the voxel 1410 may be satisfied. The feature region extraction apparatus may determine that the voxel 1410 is not a feature region, based on the connectivity condition.

The feature region extraction apparatus may calculate the connectivity condition, based on Equations 8 and 9 shown below.

$$CN_{b1b2b3}(V^l(i,j,k)) = \begin{cases} 1, & \text{if } V^l(i+b1, j+b2, k+b3) > threshold_3 \\ 0, & \text{otherwise} \end{cases}$$ [Equation 8]

where $CN_{b1b2b3}$ is a connectivity value in Equation 8, b1b2b3 denotes a variable used to indicate voxels neighboring the voxel $V^l(i, j, k)$, and each of b1, b2 and b3 may have, for example, one of values −1, 0, and 1. Naturally, a range of values of each of b1, b2 and b3 may be variously changed. The feature region extraction apparatus may determine whether the voxel $V^l(i, j, k)$ is connected to a neighboring voxel, based on an intensity of the neighboring voxel. For example, when an intensity of a neighboring voxel is greater than a third threshold $threshold_3$, the feature region extraction apparatus may determine that the voxel $V^l(i, j, k)$ is connected to the neighboring voxel.

$$C_{CN}(V^l(i,j,k)) = \begin{cases} 1, & \text{if } \sum_{b1,b2,b3} CN_{b1b2b3}(V^l(i,j,k)) > threshold_4 \\ 0, & \text{otherwise} \end{cases}$$ [Equation 9]

where $C_{CN}$ is a value indicating the connectivity condition. When the voxel $V^l(i, j, k)$ is connected to neighboring voxels, each having a value greater than a fourth threshold $threshold_4$, the connectivity condition may be satisfied. For example, the fourth threshold $threshold_4$ may be set to "3." In this example, when the voxel $V^l(i, j, k)$ is connected to at least four neighboring voxels, the connectivity condition may be satisfied.

Figure 15:
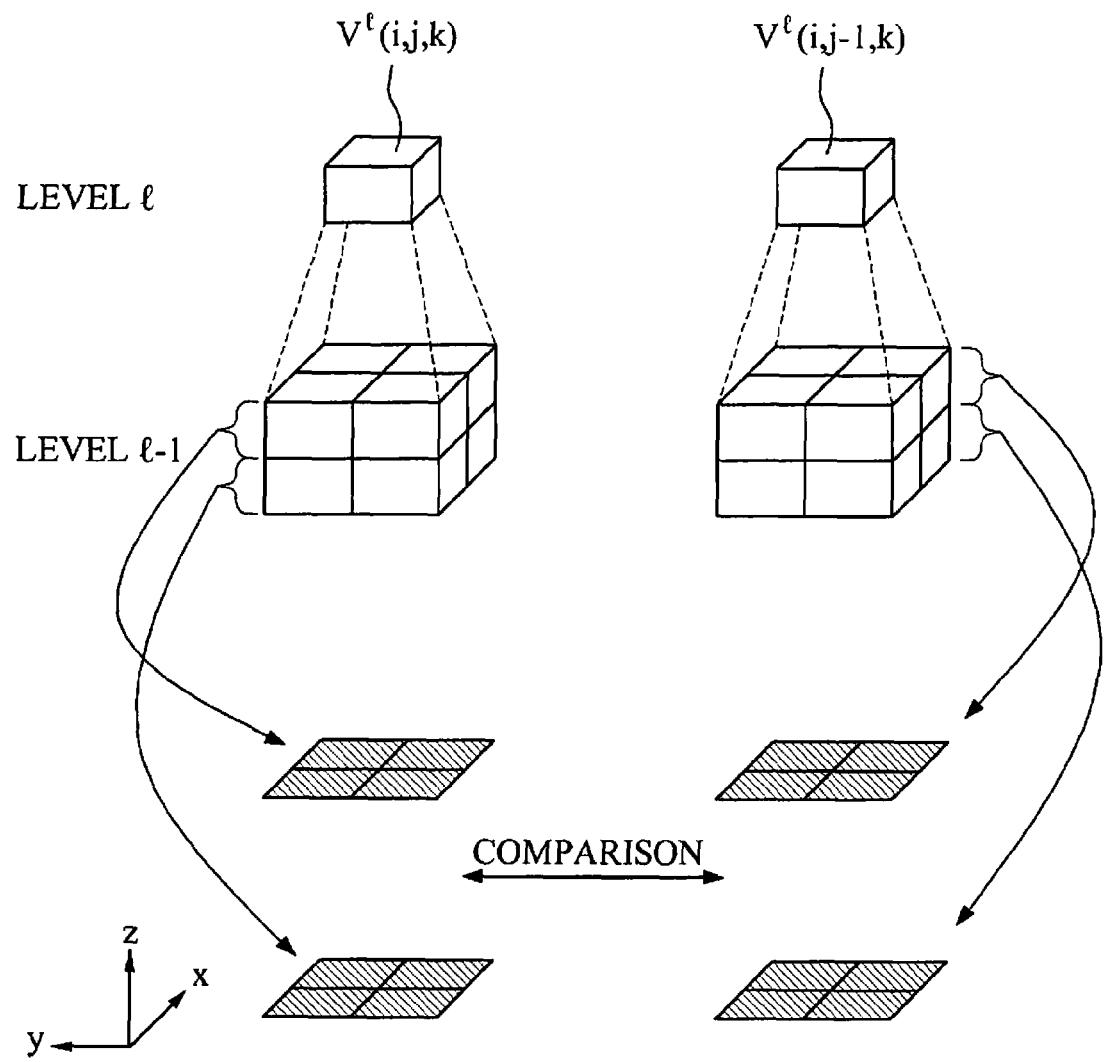
FIGS. 15 and 16 are diagrams illustrating a similarity condition according to at least one example embodiment.
Figure 16:
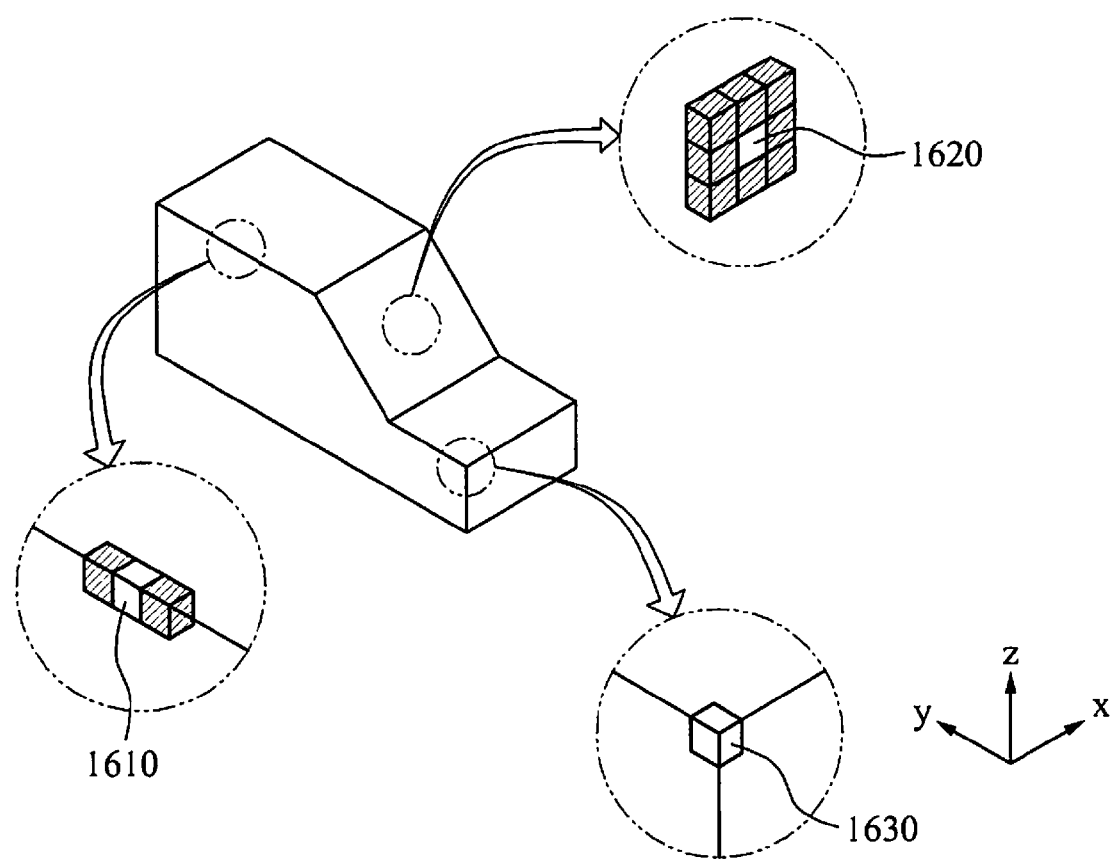

FIGS. 15 and 16 illustrate a similarity condition according to at least one example embodiment.

Referring to FIG. 15, a feature region extraction apparatus according to at least one example embodiment may calculate the similarity condition, to determine whether a voxel is a feature region. Similarity may refer to how much a voxel $V^l(i, j, k)$ is similar to a neighboring voxel. When similarity between the voxel $V^l(i, j, k)$ and a neighboring voxel increases, the voxel $V^l(i, j, k)$ may have a lower value as a feature region or a feature point.

In an example, referring to FIG. 16, a voxel 1610 has a high similarity to neighboring voxels in a y-axis direction. Additionally, a voxel 1620 has a high similarity to neighboring voxels in an x-axis direction and a z-axis direction. In this example, the feature region extraction apparatus may determine that the voxels 1610 and 1620 are not feature regions. In another example, a voxel 1630 may have a low similarity to neighboring voxels. In this example, the feature region extraction apparatus may determine that the voxel 1630 is a feature region.

The feature region extraction apparatus may calculate the similarity condition, based on Equations 10 and 11 shown below.

$$SI_{b1b2b3}(V^l(i, j, k)) = \begin{cases} 1, & \text{if } \sum_{a1,a2,a3} \left| \begin{array}{c} V_{a1a2a3}^{l-1}(i, j, k) - \\ V_{a1a2a3}^{l-1}(i+b1, j+b2, k+b3) \end{array} \right| < threshold_5 \\ 0, & \text{otherwise} \end{cases}$$ [Equation 10]

where $SI_{b1b2b3}$ is a similarity value. In Equation 10, a1a2a3 denotes a variable used to indicate subbands of a voxel $V^l(i, j, k)$, and may have, for example, one of values LLL, HLL, LHL, HHL, LLH, HLH, LHH, and HHH. Additionally, b1b2b3 denotes a variable used to indicate voxels neighboring the voxel $V^l(i, j, k)$, and each of b1, b2 and b3 may have, for example, one of values −1, 0, and 1. Naturally, a range of values of each of b1, b2 and b3 may be variously changed.

The feature region extraction apparatus may add up differences between a first subband to an eighth subband of the voxel $V^l(i, j, k)$ and a first subband to an eighth subband of a neighboring voxel. When a sum of the differences is less than a fifth threshold $threshold_5$, the feature region extraction apparatus may determine that the voxel $V^l(i, j, k)$ is similar to the neighboring voxel.

$$C_{SI}(V^l(i, j, k)) = \begin{cases} 1, & \text{if } \sum_{b1,b2,b3} SI_{b1b2b3}(V^l(i, j, k)) > threshold_6 \\ 0, & \text{otherwise} \end{cases}$$ [Equation 11]

where $C_{SI}$ is a value indicating the similarity value. When a number of neighboring voxels similar to the voxel $V^l(i, j, k)$ is less than a sixth threshold $threshold_6$, the similarity condition may be satisfied. For example, the sixth threshold $threshold_6$ may be set to "3." In this example, when the number of neighboring voxels similar to the voxel $V^l(i, j, k)$ is equal to or less than "2," the similarity condition may be satisfied.

The feature region extraction apparatus may finally determine whether a voxel is a feature region, based on a combination of the saliency condition, the connectivity condition, and the similarity condition. For example, the feature region extraction apparatus may determine, as a feature region, a voxel satisfying all of the saliency condition, the connectivity condition, and the similarity condition. In this example, the feature region extraction apparatus may use Equation 12 shown below.

$$FR(V^l(i,j,k))C_{SA}(V^l(i,j,k))C_{CN}(V^l(i,j,k))C_{SI}(V^l(i,j,k))$$ [Equation 12]

In Equation 12, $FR(V^l(i, j, k))$ indicates whether a voxel $V^l(i, j, k)$ is a feature region. For example, when $FR(V^l(i, j, k))$ has a value of "1," the voxel $V^l(i, j, k)$ may be a feature region. In another example, when $FR(V^l(i, j, k))$ has a value of "0," the voxel $V^l(i, j, k)$ may not be a feature region.

Figure 17:
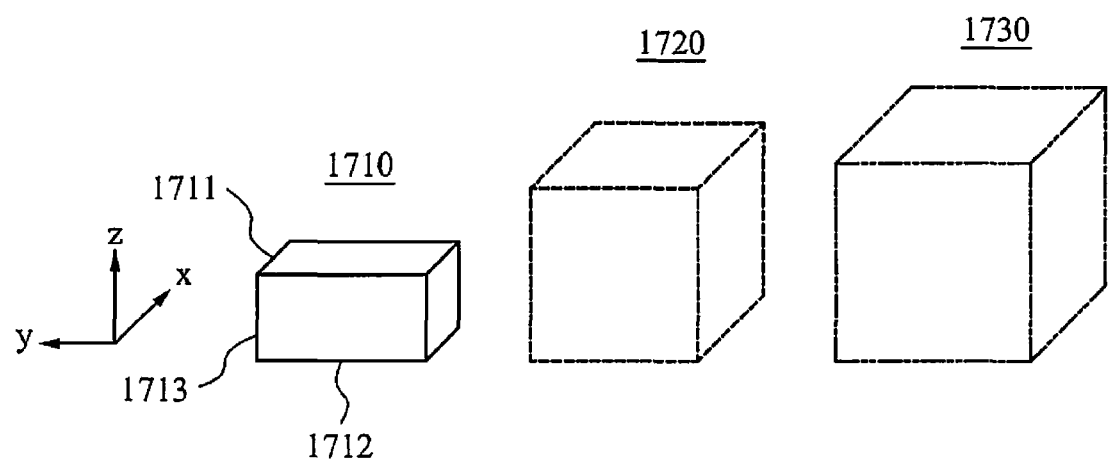
FIG. 17 is a diagram illustrating a method of setting a range of a voxel grid according to at least one example embodiment.

FIG. 17 is a diagram illustrating a method of setting a range of a voxel grid according to at least one example embodiment.

Referring to FIG. 17, a feature region extraction apparatus according to at least one example embodiment may set a range of a voxel grid based on Equations 13, 14 and 15.

$$l_u(P)=|\max(P_u)-\min(P_u)|, u\in\{x,y,z\}$$ [Equation 13]

In Equation 13, P denotes a point cloud, and $l_u(P)$ denotes a length of an edge 1711 in an x-axis direction, an edge 1712 in a y-axis direction, an edge 1713 in a z-axis direction of a rectangular parallelepiped region 1710.

$$qml(P)=\max(l_u(P)), u\in\{x,y,z\}$$ [Equation 14]

In Equation 14, qml(P) denotes a length of a longest edge among the edges 1711 to 1713. The value qml(P) may denote a quasi-minimum length of a point cloud. The feature region extraction apparatus may generate a regular hexahedral region 1720 having a single edge with a length set to qml(P).

$$ml(P)=2^nwm(2^nw(m-1)<qml(P)\le 2^nwm)$$ [Equation 15]

In Equation 15, n denotes a number of levels at which a DWT is to be repeated, w denotes a minimum length of a voxel at a level 0, and m denotes an arbitrary positive integral. The feature region extraction apparatus may set a value of $2^nwm$ as a value of ml(P). The value of $2^nwm$ may be equal to or greater than a value of qml(p) which is greater than a value of $2^nw(m-1)$. The value of ml(P) may also be a multiple of $2^nw$. For example, when n and w are set to "3," and "8," respectively, the value of ml(P) may be set to a minimum value greater than the value of qml(P) among multiples of "64" obtained by multiplying $2^3$ by 8.

The feature region extraction apparatus may generate a regular hexahedral region 1730 having a single edge with a length set to ml(P). Because a DWT allows a length of each edge of a target region to be reduced by half every time the DWT is repeated, a length of an edge corresponding to a lowest level may be set to an integer when a length of an edge corresponding to a highest level is set to a multiple of $2^n$. The feature region extraction apparatus may increase a speed of the DWT by setting a length of a single edge of the regular hexahedral region 1730 to a multiple of $2^n$. For example, the feature region extraction apparatus may generate the regions 120 of FIG. 1 to have regular hexahedral shapes having a single edge with a length set to ml(P).

Figure 18:
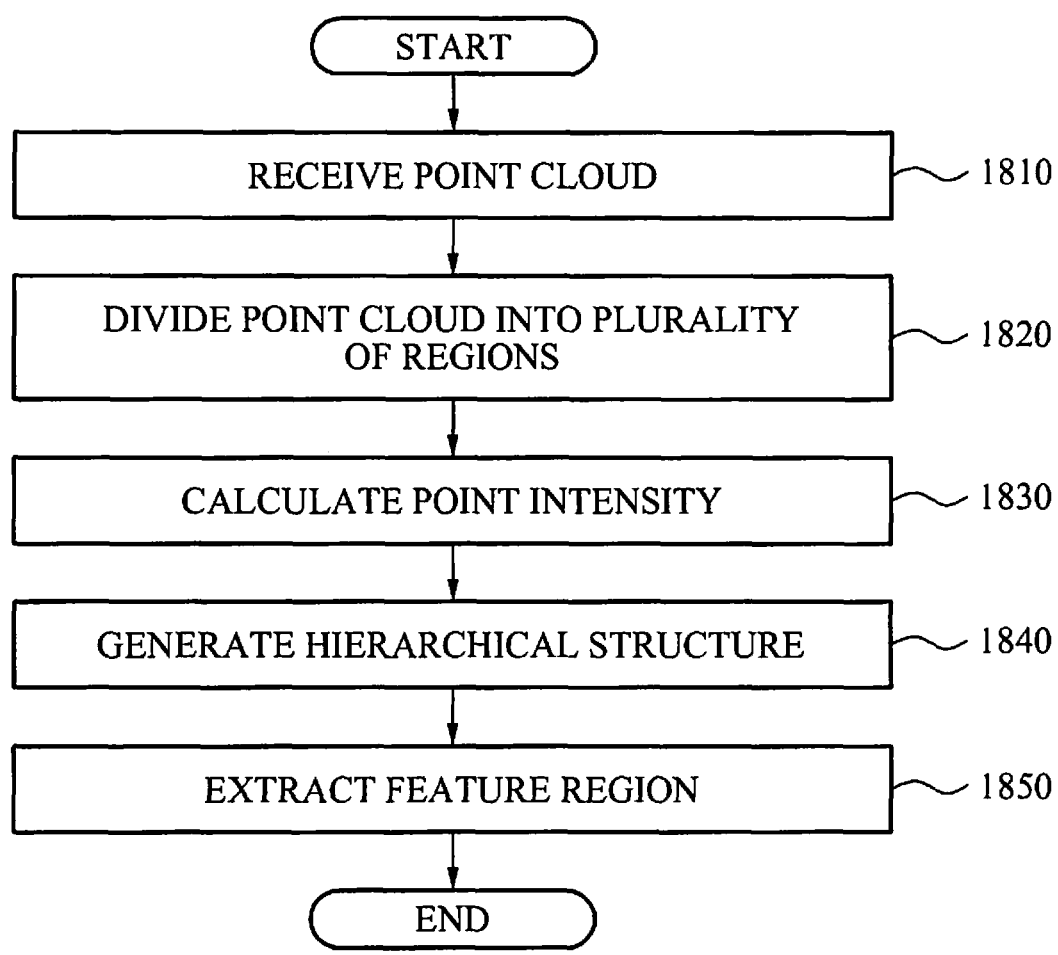
FIG. 18 is a flowchart illustrating a feature region extraction method according to at least one example embodiment.

FIG. 18 is a flowchart illustrating a feature region extraction method according to at least one example embodiment.

Referring to FIG. 18, the feature region extraction method receives a point cloud in operation 1810, divides the point cloud into a plurality of regions in operation 1820, calculates a point intensity of each of the regions in operation 1830, generates a hierarchical structure based on the point intensity in operation 1840, and extracts a feature region based on the hierarchical structure in operation 1850.

Figure 19:
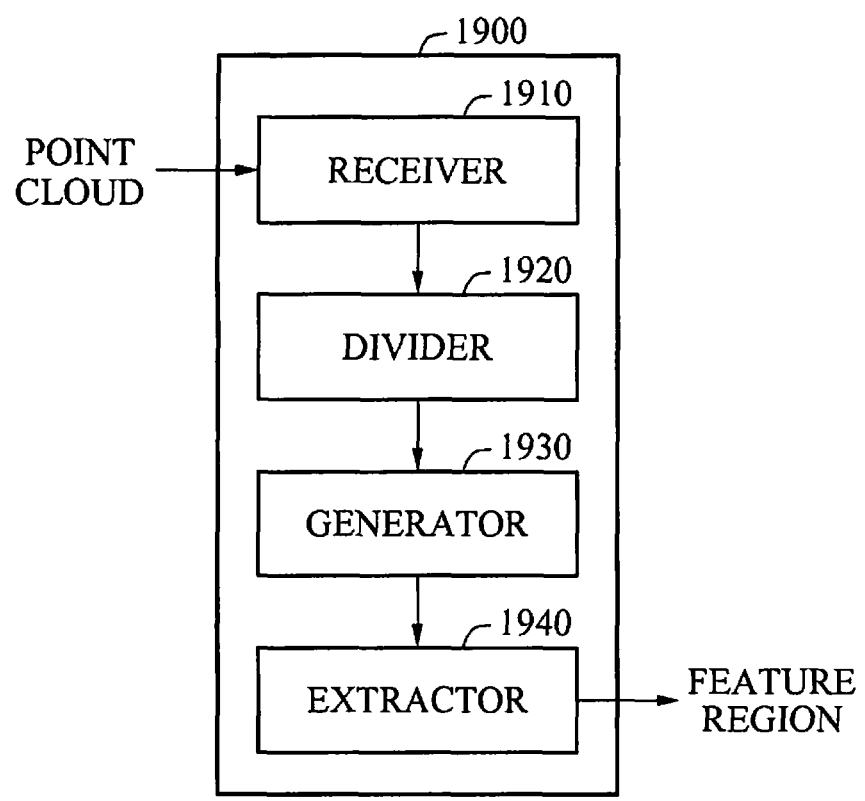
FIG. 19 is a block diagram illustrating an example of a feature region extraction apparatus according to at least one example embodiment.

FIG. 19 is a block diagram illustrating a feature region extraction apparatus 1900 according to at least one example embodiment.

Referring to FIG. 19, the feature region extraction apparatus 1900 includes a receiver 1910, a divider 1920, a generator 1930, and an extractor 1940. The receiver 1910 may receive a point cloud. The divider 1920 may divide the point cloud into a plurality of regions. The generator 1930 may generate a hierarchical structure in which the regions are arranged in a hierarchy. The extractor 1940 may extract at least one feature region by exploring the regions based on the hierarchical structure.

The receiver 1910, the divider 1920, the generator 1930, and the extractor 1940 may be hardware, firmware, hardware executing software or any combination thereof. When at least one of the receiver 1910, the divider 1920, the generator 1930, and the extractor 1940 is hardware, such existing hardware may include one or more Central Processing Units (CPUs), digital signal processors (DSPs), application-specific-integrated-circuits (ASICs), field programmable gate arrays (FPGAs) computers or the like configured as special purpose machines to perform the functions of the at least one of the receiver 1910, the divider 1920, the generator 1930, and the extractor 1940. CPUs, DSPs, ASICs and FPGAs may generally be referred to as processors and/or microprocessors.

In the event where at least one of the receiver 1910, the divider 1920, the generator 1930, and the extractor 1940 is a processor executing software, the processor is configured as a special purpose machine to execute the software, stored in a storage medium, to perform the functions of the at least one of the receiver 1910, the divider 1920, the generator 1930, and the extractor 1940. In such an embodiment, the feature region extraction apparatus 1900 may include the processor which may include one or more Central Processing Units (CPUs), digital signal processors (DSPs), application-specific-integrated-circuits (ASICs), field programmable gate arrays (FPGAs) computers.

Figure 20:
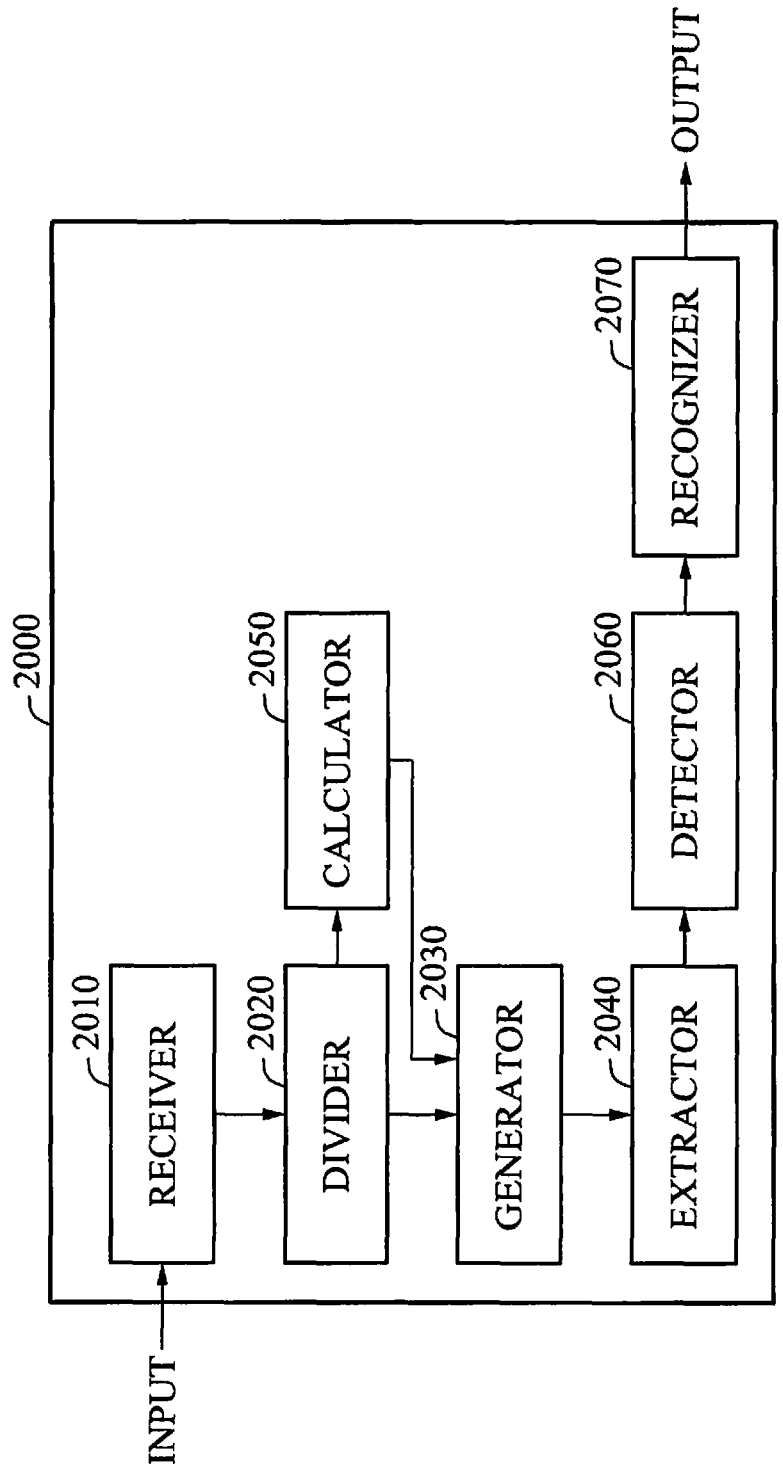
FIG. 20 is a block diagram illustrating another example of a feature region extraction apparatus according to at least one example embodiment.

FIG. 20 is a block diagram illustrating a feature region extraction apparatus 2000 according to at least one example embodiment.

Referring to FIG. 20, the feature region extraction apparatus 2000 includes a receiver 2010, a divider 2020, a generator 2030, and an extractor 2040. The receiver 2010 may receive a point cloud. The divider 2020 may divide the point cloud into a plurality of regions. The generator 2030 may generate a hierarchical structure in which the regions are arranged in a hierarchy. The extractor 2040 may extract at least one feature region by exploring the regions based on the hierarchical structure.

The feature region extraction apparatus 2000 may further include a calculator 2050. The calculator 2050 may calculate a point intensity corresponding to each of the regions. Additionally, the feature region extraction apparatus 2000 may further include a detector 2060. The detector 2060 may extract a feature point from the extracted feature region. Furthermore, the feature region extraction apparatus 2000 may further include a recognizer 2070. The recognizer 2070 may recognize at least one of an operation corresponding to the point cloud and an object corresponding to the point cloud based on the extracted feature point.

The receiver 2010, the divider 2020, the generator 2030, and the extractor 2040 may be hardware, firmware, hardware executing software or any combination thereof. When at least one of the receiver 2010, the divider 2020, the generator 2030, and the extractor 2040 is hardware, such existing hardware may include one or more Central Processing Units (CPUs), digital signal processors (DSPs), application-specific-integrated-circuits (ASICs), field programmable gate arrays (FPGAs) computers or the like configured as special purpose machines to perform the functions of the at least one of the receiver 2010, the divider 2020, the generator 2030, and the extractor 2040.

In the event where at least one of the receiver 2010, the divider 2020, the generator 2030, and the extractor 2040 is a processor executing software, the processor is configured as a special purpose machine to execute the software, stored in a storage medium, to perform the functions of the at least one of receiver 2010, the divider 2020, the generator 2030, and the extractor 2040. In such an embodiment, the feature region extraction apparatus 2000 may include the processor which may include one or more Central Processing Units (CPUs), digital signal processors (DSPs), application-specific-integrated-circuits (ASICs), field programmable gate arrays (FPGAs) computers.

The above-description of FIGS. 1 to 17 is also applicable to the method of FIG. 18, the feature region extraction apparatus 1900 of FIG. 19 and the feature region extraction apparatus 2000 of FIG. 20 and accordingly, will not be repeated here. In other words, the feature region extraction apparatuses 1900 and 2000 are configured to perform the corresponding functions described above.

As described, the units described herein may be implemented using hardware components, software components, or a combination thereof. For example, a processing device may be implemented using one or more special purpose computers, such as, for example, a processor and/or a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more non-transitory computer readable recording mediums.

The above-described example embodiments may be recorded in non-transitory computer-readable media including program instructions to implement various operations embodied by a computer. The term "computer-readable media", "storage medium", "computer readable storage medium" or "non-transitory computer readable storage medium" may represent one or more devices for storing data The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. The non-transitory computer-readable media may also be a distributed network, so that the program instructions are stored and executed in a distributed fashion. The program instructions may be executed by one or more processors. The non-transitory computer-readable media may also be embodied in at least one application specific integrated circuit (ASIC) or Field Programmable Gate Array (FPGA), which executes (processes like a processor) program instructions. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

Although example embodiments have been shown and described, it would be appreciated by those skilled in the art that changes may be made in these example embodiments without departing from the principles and spirit of the disclosure, the scope of which is defined by the claims and their equivalents.

What is claimed is:

1. A method of extracting at least one feature region in an image, the method comprising:
   dividing a point cloud of the image into a plurality of regions, the point cloud being points in a three-dimensional (3D) coordinate system; and
   extracting the at least one feature region from among the plurality of regions based on at least one point intensity in the point cloud, wherein the at least one feature region comprises a feature point of the point cloud, the feature point being one of a plurality of points in the point cloud, wherein the extracting includes,
      generating a hierarchical structure, the plurality of regions being arranged in a hierarchy in the hierarchical structure based on a rate of change of the at least one point intensity in the point cloud, and
      analyzing the plurality of regions based on the hierarchical structure.

2. The method of claim 1, wherein the point intensity is associated with a concentration of the plurality of points in the point cloud.

3. The method of claim 1, further comprising:
   calculating a point intensity for each of the plurality of regions.

4. The method of claim 3, wherein the calculating calculates each point intensity based on a number of points included in the corresponding region.

5. The method of claim 1, wherein each of the plurality of regions is associated with a respective level in the hierarchical structure and a first level of the hierarchical structure comprises information on point intensities corresponding to regions included in a second level of the hierarchical structure, the first level being higher than the second level in the hierarchical structure.

6. The method of claim 5, wherein the extracting includes:
   analyzing a first region in the second level of the hierarchical structure if a second region in the first level of hierarchical structure is analyzed.

7. The method of claim 6, wherein the analyzing the first region is based on whether the second region is the at least one feature region.

8. The method of claim 1, wherein the generating generates the hierarchical structure by applying a discrete wavelet transform (DWT) to the plurality of regions.

9. The method of claim 8, wherein the extracting extracts the at least one feature region based on DWT subbands.

10. The method of claim 1, wherein the extracting extracts the at least one feature region based on at least one of:
   a first condition associated with at least one high frequency feature of a selected region of the plurality of regions;
   a second condition associated with whether the selected region is connected to at least one neighboring region; and
   a third condition associated with whether the selected region is similar to the at least one neighboring region.

11. The method of claim 10, wherein if a number of high frequency features is greater than a first threshold, the first condition is satisfied.

12. The method of claim 10, wherein for each of the at least one neighboring region having a point intensity greater than a second threshold, if a number of the at least one neighboring region is greater than a first threshold, the second condition is satisfied.

13. The method of claim 10, wherein for each of the at least one neighboring region having a high frequency feature difference less than a second threshold, if a number of the at least one neighboring region is less than a first threshold, the third condition is satisfied, and the high frequency feature difference is a difference between a high frequency feature of the corresponding region and a high frequency feature of another neighboring region.

14. The method of claim 1, further comprising:
   determining a size of each of the plurality of regions based on at least one of a distribution of the point cloud and a depth of a hierarchical structure of the plurality of regions.

15. The method of claim 14, wherein the plurality of regions each has a regular hexahedral shape.

16. The method of claim 1, further comprising:
   extracting the feature point from the at least one feature region.

17. The method of claim 16, further comprising:
   recognizing at least one of an object corresponding to the point cloud and an operation corresponding to the point cloud, based on the feature point.

18. A non-transitory computer readable recording medium storing a program to cause a computer to implement the method of claim 1.

19. The method of claim 1, wherein the generating the hierarchical structure comprises:
   generating a feature value of first regions based on point intensities of the first regions corresponding to a first level; and
   associating a second region corresponding to a second level, which is an upper layer of the first level, with the first regions based on the feature value.

20. An apparatus for extracting a feature region, the apparatus comprising:
   a memory storing computer-readable instructions; and
   at least one processor configured to execute the computer-readable instructions to,
      receive a point cloud, the point cloud being points in a three-dimensional (3D) coordinate system,
      divide the point cloud into a plurality of regions,
      generate a hierarchical structure in which the plurality of regions are arranged in a hierarchy based on a rate of change of at least one point intensity in the point cloud, and
      extract at least one feature region from the plurality of regions based on the hierarchical structure.

21. The apparatus of claim 20, wherein the at least one feature region comprises a feature point of the point cloud.

22. The apparatus of claim 21, wherein the at least one processor is configured to execute the computer-readable instructions to extract the feature point from among the at least one feature region.

23. The apparatus of claim 22, wherein the at least one processor is configured to execute the computer-readable instructions to recognize at least one of an object corresponding to the point cloud and an operation corresponding to the point cloud, based on the feature point.

24. The apparatus of claim 20, wherein the at least one processor is configured to execute the computer-readable instructions to extract a first region corresponding to the at least one feature region in a first level of the hierarchical structure, to generate a set of a plurality of second regions included in a second level of the hierarchical structure, and to analyze the second regions, and the first level is higher than the second level.

25. The apparatus of claim 24, wherein the at least one processor is configured to execute the computer-readable instructions to only analyze the set of the plurality of second regions in the second level.

26. The apparatus of claim 24, wherein the at least one processor is configured to execute the computer-readable instructions to extract a third region corresponding to the at least one feature region from among the second regions, to set a plurality of fourth regions included in a third level of the hierarchical structure, and to analyze the fourth regions, and the third level is lower than the second level.

27. The apparatus of claim 24, wherein the at least one processor is configured to execute the computer-readable instructions to determine regions in a lowest level of the hierarchical structure as the at least one feature region.

28. The apparatus of claim 20, wherein the at least one processor is configured to execute the computer-readable instructions to generate the hierarchical structure by applying a discrete wavelet transform (DWT) to the plurality of regions.

29. The apparatus of claim 28, wherein the at least one processor is configured to execute the computer-readable instructions to extract the at least one feature region based on DWT subbands corresponding to the plurality of regions.

30. The apparatus of claim 20, wherein the at least one processor is configured to execute the computer-readable instructions to extract the at least one feature region, based on at least one of:
a first condition associated with at least one high frequency feature of a selected region of the plurality of regions;
a second condition associated with whether the selected region is connected to at least one neighboring region; and
a third condition associated with whether the selected region is similar to the at least one neighboring region.

31. The apparatus of claim 30, wherein if a number of high frequency features is greater than a first threshold, the first condition is satisfied.

32. The apparatus of claim 30, wherein for each of the at least one neighboring region having a point intensity greater than a second threshold, if a number of the at least one neighboring region is greater than a first threshold, the second condition is satisfied.

33. The apparatus of claim 30, wherein for each of the at least one neighboring region having a high frequency feature difference less than a second threshold, if a number of the at least neighboring region is less than a first threshold, the third condition is satisfied, and the high frequency feature difference is a difference between a high frequency feature of the corresponding region and a high frequency feature of another neighboring region.

34. The apparatus of claim 20, wherein the at least one processor is configured to execute the computer-readable instructions to determine a size of each of the plurality of regions, based on at least one of a distribution of the point cloud and a depth of the hierarchical structure.

35. The apparatus of claim 34, wherein the plurality of regions each has a hexahedral shape.

36. The apparatus of claim 20, wherein the at least one processor is configured to execute the computer-readable instructions to calculate a plurality of point intensities corresponding to the plurality of regions,
wherein each of the plurality of regions is associated with a level in the hierarchical structure and first level of the hierarchical structure includes information on point intensities corresponding to regions included in a second level of the hierarchical structure, the first level being higher than the second level in the hierarchical structure.

37. The apparatus of claim 36, wherein the at least one processor is configured to execute the computer-readable instructions to determine a point intensity corresponding to a region among the plurality of regions, based on a number of points included in the corresponding region.

* * * * *